(12) United States Patent
Meschter et al.

(10) Patent No.: US 8,312,646 B2
(45) Date of Patent: *Nov. 20, 2012

(54) ARTICLE OF FOOTWEAR INCORPORATING A TENSILE ELEMENT

(75) Inventors: James C. Meschter, Portland, OR (US); Lia M. Uesato, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 564 days.

This patent is subject to a terminal disclaimer.

(21) Appl. No.: 12/546,017

(22) Filed: Aug. 24, 2009

(65) Prior Publication Data

US 2010/0037483 A1 Feb. 18, 2010

Related U.S. Application Data

(63) Continuation-in-part of application No. 11/441,924, filed on May 25, 2006, now Pat. No. 7,870,681.

(51) Int. Cl.
*A43B 23/00* (2006.01)
(52) U.S. Cl. .................... 36/45; 36/51; 36/47
(58) Field of Classification Search ............ 36/45, 47, 36/88, 93, 51, 50.1
See application file for complete search history.

(56) References Cited

U.S. PATENT DOCUMENTS

| | | |
|---|---|---|
| 2,034,091 A | 3/1936 | Dunbar |
| 2,048,294 A | 7/1936 | Roberts |
| 2,205,356 A | 6/1940 | Gruensfelder |
| 2,311,996 A | 2/1943 | Parker |
| 3,439,434 A | 4/1969 | Tangorra |
| 3,672,078 A | 6/1972 | Fukuoka |
| 3,823,493 A | 7/1974 | Brehm et al. |
| 4,627,369 A | 12/1986 | Conrad et al. |
| 4,634,616 A | 1/1987 | Musante |
| 4,642,819 A | 2/1987 | Ales et al. |
| 4,756,098 A | 7/1988 | Boggia |
| 4,858,339 A | 8/1989 | Hayafuchi et al. |
| 4,873,725 A | 10/1989 | Mitchell |
| 5,149,388 A | 9/1992 | Stahl |
| 5,156,022 A | 10/1992 | Altman |
| 5,271,130 A | 12/1993 | Batra |
| 5,285,658 A | 2/1994 | Altman et al. |

(Continued)

FOREIGN PATENT DOCUMENTS

CN 101125044 A 2/2008

(Continued)

OTHER PUBLICATIONS

Office Action mailed Dec. 19, 2008 for Chinese Invention Patent Application No. 200610139157.8.

(Continued)

*Primary Examiner* — Jila M Mohandesi
(74) *Attorney, Agent, or Firm* — Plumsea Law Group, LLC

(57) ABSTRACT

An article of footwear may have a sole structure and an upper that includes a foundation element and a tensile element. The tensile element may include a base layer and a plurality of strands, with the base layer being joined to an exterior surface of the foundation element. In manufacturing the footwear, a thermoplastic polymer material in the base layer may be utilized to bond or otherwise join the tensile element to the foundation element.

19 Claims, 36 Drawing Sheets

U.S. PATENT DOCUMENTS

| | | | |
|---|---|---|---|
| 5,345,638 | A | 9/1994 | Nishida |
| 5,359,790 | A | 11/1994 | Iverson et al. |
| 5,367,795 | A | 11/1994 | Iverson et al. |
| 5,380,480 | A | 1/1995 | Okine et al. |
| 5,399,410 | A | 3/1995 | Urase |
| 5,645,935 | A | 7/1997 | Kemper et al. |
| 5,832,540 | A | 11/1998 | Knight |
| D405,587 | S | 2/1999 | Merikoski |
| 5,930,918 | A | 8/1999 | Healy |
| 5,990,378 | A | 11/1999 | Ellis |
| 6,003,247 | A | 12/1999 | Steffe |
| 6,004,891 | A | 12/1999 | Tuppin et al. |
| 6,009,637 | A | 1/2000 | Pavone |
| 6,029,376 | A | 2/2000 | Cass |
| 6,038,702 | A | 3/2000 | Knerr |
| 6,128,835 | A | 10/2000 | Ritter |
| 6,151,804 | A | 11/2000 | Hieblinger |
| 6,164,228 | A | 12/2000 | Lin |
| 6,170,175 | B1 | 1/2001 | Funk |
| 6,213,634 | B1 | 4/2001 | Harrington et al. |
| 6,615,427 | B1 | 9/2003 | Hailey |
| 6,665,958 | B2 | 12/2003 | Goodwin |
| 6,718,895 | B1 | 4/2004 | Fortuna |
| 6,860,214 | B1 | 3/2005 | Wang |
| 6,910,288 | B2 | 6/2005 | Dua |
| 7,086,179 | B2 | 8/2006 | Dojan |
| 7,086,180 | B2 | 8/2006 | Dojan |
| 7,100,310 | B2 | 9/2006 | Foxen |
| 7,293,371 | B2 | 11/2007 | Aveni |
| 7,337,560 | B2 | 3/2008 | Marvin et al. |
| 7,546,698 | B2 * | 6/2009 | Meschter ............ 36/45 |
| 7,574,818 | B2 | 8/2009 | Meschter |
| 7,665,230 | B2 | 2/2010 | Dojan |
| 7,676,956 | B2 | 3/2010 | Dojan |
| 7,770,307 | B2 * | 8/2010 | Meschter ............ 36/45 |
| 7,793,434 | B2 * | 9/2010 | Sokolowski et al. ...... 36/45 |
| 7,849,518 | B2 | 12/2010 | Moore et al. |
| 7,870,681 | B2 * | 1/2011 | Meschter ............ 36/45 |
| 7,870,682 | B2 | 1/2011 | Meschter et al. |
| 2001/0051484 | A1 | 12/2001 | Ishida et al. |
| 2003/0178738 | A1 | 9/2003 | Staub et al. |
| 2004/0074589 | A1 | 4/2004 | Gessler et al. |
| 2004/0118018 | A1 | 6/2004 | Dua |
| 2004/0142631 | A1 | 7/2004 | Luk |
| 2004/0181972 | A1 | 9/2004 | Csorba |
| 2004/0261295 | A1 | 12/2004 | Meschter |
| 2005/0028403 | A1 | 2/2005 | Swigart |
| 2005/0115284 | A1 | 6/2005 | Dua |
| 2005/0132609 | A1 | 6/2005 | Dojan |
| 2005/0268497 | A1 | 12/2005 | Alfaro |
| 2006/0048413 | A1 | 3/2006 | Sokolowski |
| 2006/0137221 | A1 | 6/2006 | Dojan |
| 2007/0199210 | A1 | 8/2007 | Vattes et al. |
| 2007/0271821 | A1 | 11/2007 | Meschter |
| 2008/0110049 | A1 | 5/2008 | Sokolowski et al. |
| 2010/0018075 | A1 | 1/2010 | Meschter et al. |
| 2010/0037483 | A1 | 2/2010 | Meschter et al. |
| 2010/0043253 | A1 | 2/2010 | Dojan |
| 2010/0154256 | A1 | 6/2010 | Dua |
| 2010/0175276 | A1 | 7/2010 | Dojan et al. |
| 2010/0251491 | A1 | 10/2010 | Dojan et al. |
| 2010/0251564 | A1 | 10/2010 | Meschter |
| 2011/0041359 | A1 | 2/2011 | Dojan et al. |

FOREIGN PATENT DOCUMENTS

| | | |
|---|---|---|
| DE | 20215559 | 1/2003 |
| EP | 0082824 | 6/1983 |
| EP | 0818289 A2 | 1/1998 |
| FR | 1462349 A | 2/1967 |
| FR | 2046671 | 3/1971 |
| FR | 2457651 A1 | 12/1980 |
| WO | 98/43506 A | 10/1998 |
| WO | 9843506 A1 | 10/1998 |
| WO | 03/013301 A1 | 2/2003 |
| WO | 03013301 A1 | 2/2003 |
| WO | WO2004089609 | 10/2004 |
| WO | WO2007139567 | 12/2007 |
| WO | WO2007140055 | 12/2007 |

OTHER PUBLICATIONS

Office Action mailed Jul. 10, 2009 for Chinese Invention Patent Application No. 200610139157.8.

Office Action mailed Jan. 8, 2010 for Chinese Invention Patent Application No. 200610139157.8.

Office Action mailed May 15, 2009 for Chinese Invention Patent Application No. 200710105234.2.

Office Action mailed Jun. 19, 2009 for Chinese Invention Patent Application No. 200710105235.7.

Office Action mailed Jan. 29, 2010 for Chinese Invention Patent Application No. 200710105235.7.

Office Action mailed Mar. 30, 2009 for European Patent Application No. 07760707.5.

Notice of Allowance mailed Jun. 15, 2010 for U.S. Appl. No. 12/180,342.

Notice of Allowance mailed Apr. 15, 2010 for U.S. Appl. No. 12/362,371.

Notice of Allowance and Fees Due mailed Sep. 7, 2010 for U.S. Appl. No. 11/441,924.

Office Action mailed on Aug. 23, 2010 for U.S. Appl. No. 11/838,011.

International Search Report and Written Opinion for PCT/US2007/066696, mailed Sep. 7, 2007.

Invitation to Pay Additional Fees and Partial International Search for PCT/US2007/066701, mailed Oct. 18, 2007.

Office Action mailed Nov. 24, 2008 for U.S. Appl. No. 11/442,669.

Office Action mailed Dec. 8, 2008 for U.S. Appl. No. 11/442,679.

Notice of Allowance mailed Feb. 10, 2009 for U.S. Appl. No. 11/442,679.

Notice of Allowance mailed Apr. 15, 2009 for U.S. Appl. No. 11/442,669.

Office Action mailed Feb. 27, 2009 for U.S. Appl. No. 12/117,546.

Office Action mailed Mar. 2, 2009 for U.S. Appl. No. 12/118,000.

Notice of Allowance mailed Sep. 7, 2010 for U.S. Appl. No. 11/441,924.

Notice of Allowance mailed on Sep. 17, 2010 in U.S. Appl. No. 11/838,011.

International Search Report and Written Opinion for PCT/US2010/046115, mailed Dec. 27, 2010.

International Search Report and Written Opinion for PCT/US2010/040607, mailed Jan. 24, 2011.

International Search Report and Written Opinion for PCT/US2010/046133, mailed Dec. 27, 2010.

Notice of Allowability mailed Feb. 10, 2009 for U.S. Appl. No. 11/442,679.

Notice of Allowability mailed Apr. 15, 2009 for U.S. Appl. No. 11/442,669.

Office Action mailed Jan. 27, 2010 for U.S. Appl. No. 11/441,924.

Office Action mailed Feb. 19, 2010 for U.S. Appl. No. 12/362,371.

Office Action mailed Feb. 24, 2010 for U.S. Appl. No. 12/180,342.

U.S. Appl. No. 11/442,669, filed May 25, 2006, and entitled "Article of Footwear Having an Upper With Thread Structural Elements," issued as U.S. Patent No. 7,574,818 on Aug. 18, 2009.

U.S. Appl. No. 11/442,679, filed May 25, 2006, and entitled "Article of Footwear Having an Upper With Thread Structural Elements," issued as U.S. Patent No. 7,546,698 on Jun. 16, 2009.

U.S. Appl. No. 11/441,924, filed May 25, 2006, and entitled "Article of Footwear Having an Upper With Thread Structural Elements."

U.S. Appl. No. 11/838,011, filed Aug. 13, 2007, and entitled "Article of Footwear Having an Upper With Thread Structural Elements."

U.S. Appl. No. 12/180,235, filed Jul. 25, 2008, and entitled "Composite Element With a Polymer Connecting Layer."

U.S. Appl. No. 12/180,342, filed Jul. 25, 2008, and entitled "Article of Footwear Having an Upper With Thread Structural Elements."

U.S. Appl. No. 12/362,371, filed Jan. 29, 2009, and entitled "Article of Footwear Having an Upper With Thread Structural Elements."

U.S. Appl. No. 12/419,987, filed Apr. 7, 2009, and entitled "Footwear Incorporating Crossed Tensile Strand Elements."

U.S. Appl. No. 12/419,985, filed Apr. 7, 2009, and entitled "Method for Molding Tensile Strand Elements."

U.S. Appl. No. 12/505,740, filed Jul. 20, 2009, and entitled "Material Elements Incorporating Tensile Strands."

U.S. Appl. No. 12/546,019, filed Aug. 24, 2009, and entitled "Article of Footwear Having an Upper Incorporating a Tensile Strand With a Cover Layer."

U.S. Appl. No. 12/546,022, filed Aug. 24, 2009, and entitled "Article of Footwear Incorporating Tensile Strands and Securing Strands."

Notice of Allowance mailed Nov. 5, 2009 for U.S. Appl. No. 12/117,546.

Notice of Allowance mailed Oct. 21, 2009 for U.S. Appl. No. 12/118,000.

Office Action mailed Jul. 12, 2010 for U.S. Appl. No. 11/441,924.

* cited by examiner

ARTICLE OF FOOTWEAR INCORPORATING A TENSILE ELEMENT

CROSS-REFERENCE TO RELATED APPLICATION

This U.S. patent application is a continuation-in-part application and claims priority under 35 U.S.C. §120 to U.S. patent application Ser. No. 11/441,924, which was filed in the U.S. Patent and Trademark Office on 25 May 2006 and entitled Article Of Footwear Having An Upper With Thread Structural Elements, and which issued as U.S. Pat. No. 7,870,681 on 18 Jan. 2011, such prior U.S. patent application being entirely incorporated herein by reference.

BACKGROUND

Articles of footwear generally include two primary elements: an upper and a sole structure. The upper is often formed from a plurality of material elements (e.g., textiles, polymer sheet layers, foam layers, leather, synthetic leather) that are stitched or adhesively bonded together to form a void on the interior of the footwear for comfortably and securely receiving a foot. More particularly, the upper forms a structure that extends over instep and toe areas of the foot, along medial and lateral sides of the foot, and around a heel area of the foot. The upper may also incorporate a lacing system to adjust fit of the footwear, as well as permitting entry and removal of the foot from the void within the upper. In addition, the upper may include a tongue that extends under the lacing system to enhance adjustability and comfort of the footwear, and the upper may incorporate a heel counter.

The various material elements forming the upper impart specific properties to different areas of the upper. For example, textile elements may provide breathability and may absorb moisture from the foot, foam layers may compress to impart comfort, and leather may impart durability and wear-resistance. As the number of material elements increases, the overall mass of the footwear may increase proportionally. The time and expense associated with transporting, stocking, cutting, and joining the material elements may also increase. Additionally, waste material from cutting and stitching processes may accumulate to a greater degree as the number of material elements incorporated into an upper increases. Moreover, products with a greater number of material elements may be more difficult to recycle than products formed from fewer material elements. By decreasing the number of material elements, therefore, the mass of the footwear and waste may be decreased, while increasing manufacturing efficiency and recyclability.

The sole structure is secured to a lower portion of the upper so as to be positioned between the foot and the ground. In athletic footwear, for example, the sole structure includes a midsole and an outsole. The midsole may be formed from a polymer foam material that attenuates ground reaction forces (i.e., provides cushioning) during walking, running, and other ambulatory activities. The midsole may also include fluid-filled chambers, plates, moderators, or other elements that further attenuate forces, enhance stability, or influence the motions of the foot, for example. The outsole forms a ground-contacting element of the footwear and is usually fashioned from a durable and wear-resistant rubber material that includes texturing to impart traction. The sole structure may also include a sockliner positioned within the upper and proximal a lower surface of the foot to enhance footwear comfort.

SUMMARY

An article of footwear is disclosed below as having an upper and a sole structure secured to the upper. The upper includes a foundation element and a tensile element. The foundation element has an interior surface and an opposite exterior surface, and the interior surface defines at least a portion of a void within the upper for receiving a foot of a wearer. The tensile element includes a base layer and a plurality of strands. The base layer is secured to the exterior surface of the foundation element, and the base layer is located between the strands and the exterior surface of the foundation element. The base layer defining a plurality of edges that expose at least one area of the exterior surface, and the strands are positioned in contact with the base layer and substantially parallel to the base layer for a distance of at least five centimeters.

A method of manufacturing an article of footwear is also disclosed. The method includes locating a plurality of strands between a base layer and a cover layer. The base layer may include a thermoplastic polymer material that is heated to join the base layer to the cover layer. The base layer is placed adjacent to a foundation element of an upper of the article of footwear. Additionally, the base layer is joined to the foundation element with the thermoplastic polymer material, at least a portion of the foundation element being exposed to form an exterior surface of the upper.

The advantages and features of novelty characterizing aspects of the invention are pointed out with particularity in the appended claims. To gain an improved understanding of the advantages and features of novelty, however, reference may be made to the following descriptive matter and accompanying figures that describe and illustrate various configurations and concepts related to the invention.

FIGURE DESCRIPTIONS

The foregoing Summary and the following Detailed Description will be better understood when read in conjunction with the accompanying figures.

DETAILED DESCRIPTION

The following discussion and accompanying figures disclose various configurations of an article of footwear incorporating a tensile element that includes various strands. The article of footwear is disclosed as having a general configuration suitable for walking or running. Concepts associated with the article of footwear may also be applied to a variety of other footwear types, including baseball shoes, basketball shoes, cross-training shoes, cycling shoes, football shoes, tennis shoes, soccer shoes, and hiking boots, for example. The concepts may also be applied to footwear types that are generally considered to be non-athletic, including dress shoes, loafers, sandals, and work boots. The various concepts disclosed herein apply, therefore, to a wide variety of footwear types. In addition to footwear, the tensile strands or concepts associated with the tensile strands may be incorporated into a variety of other products.

General Footwear Structure

Figure 1:
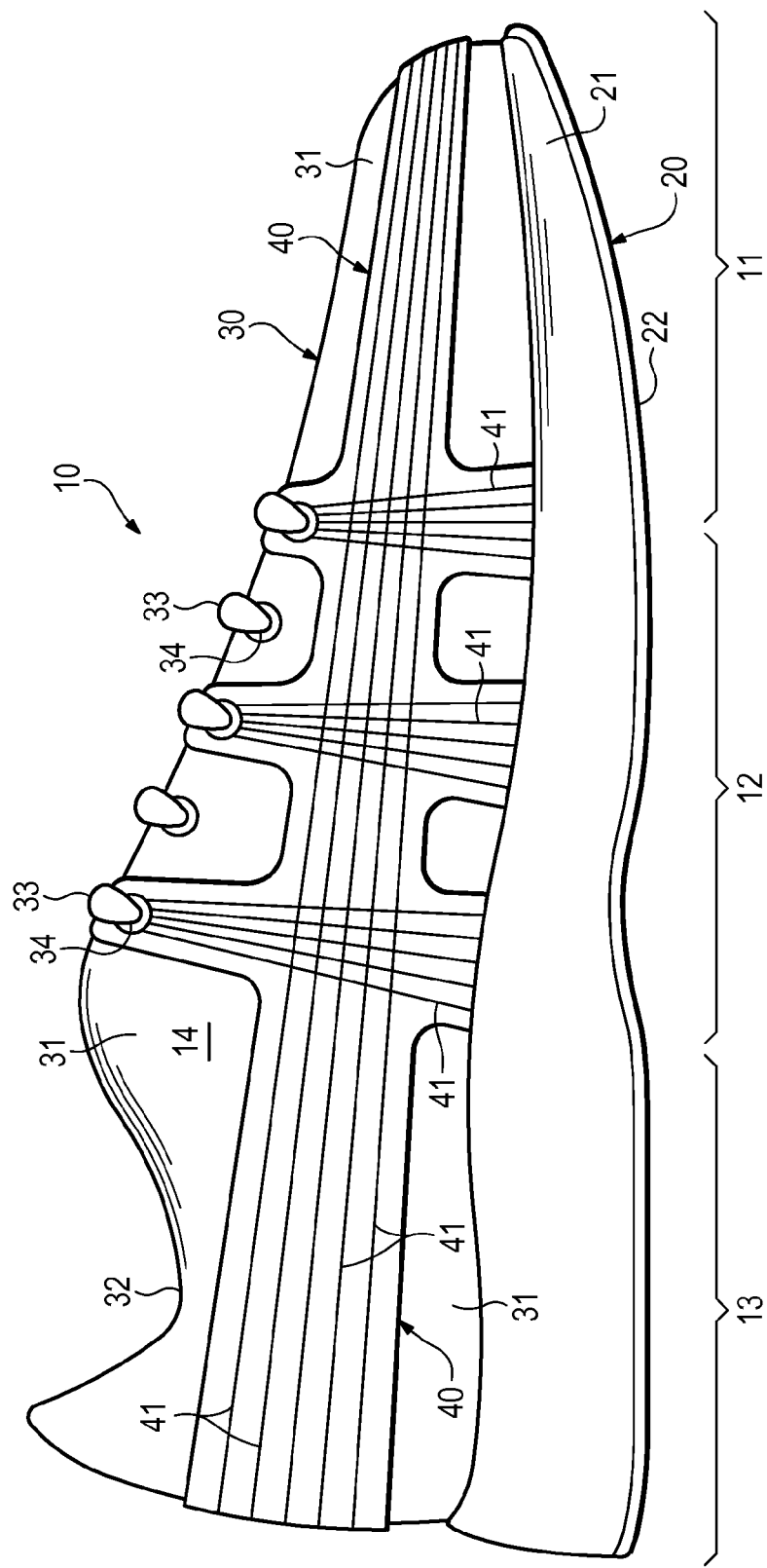
FIG. 1 is a lateral side elevational view of an article of footwear.
Figure 2:
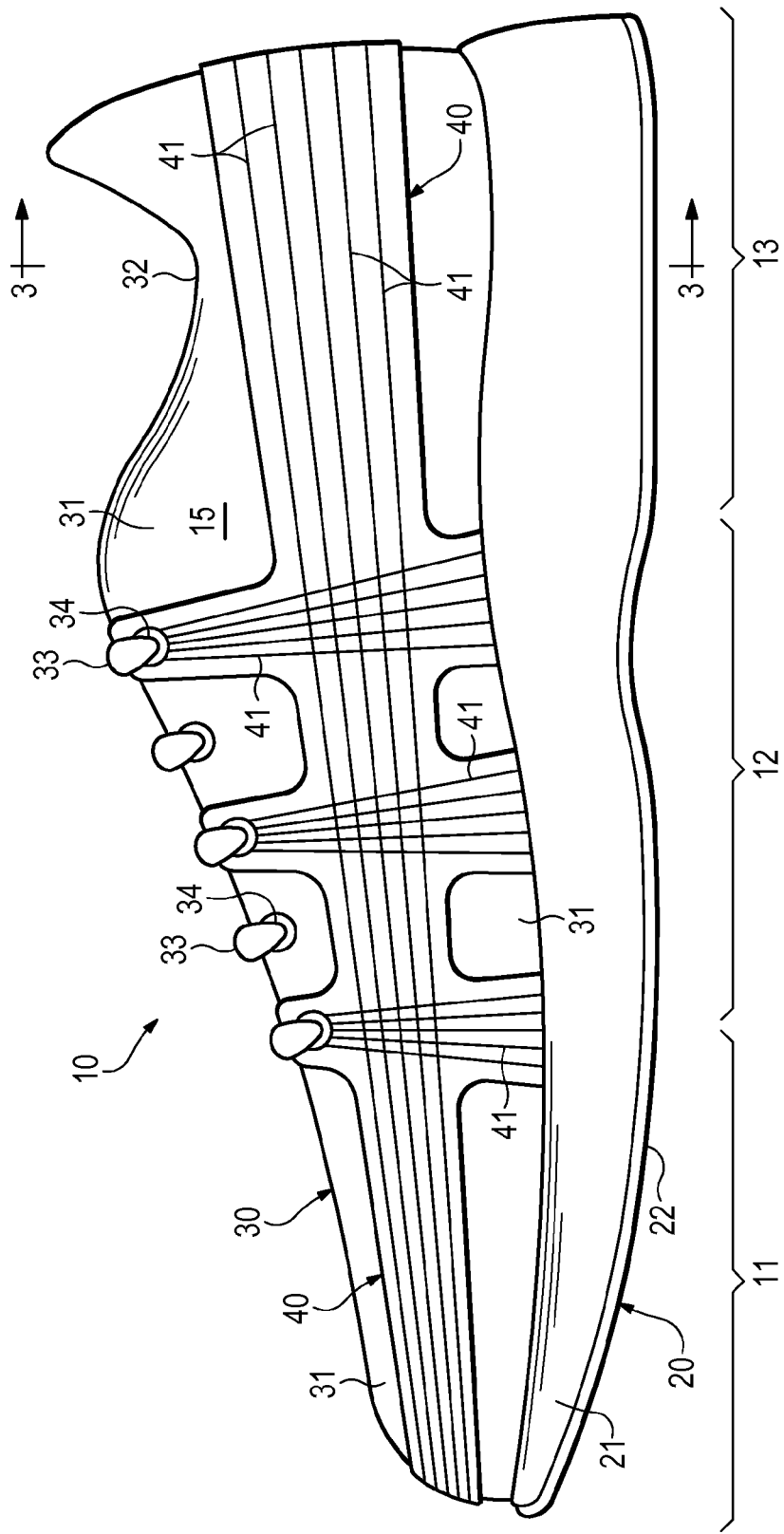
FIG. 2 is a medial side elevational view of the article of footwear.

An article of footwear 10 is depicted in FIGS. 1-5 as including a sole structure 20 and an upper 30. For reference purposes, footwear 10 may be divided into three general regions: a forefoot region 11, a midfoot region 12, and a heel region 13, as shown in FIGS. 1 and 2. Footwear 10 also includes a lateral side 14 and a medial side 15. Forefoot region 11 generally includes portions of footwear 10 corresponding with the toes and the joints connecting the metatarsals with the phalanges. Midfoot region 12 generally includes portions of footwear 10 corresponding with the arch area of the foot, and heel region 13 corresponds with rear portions of the foot, including the calcaneus bone. Lateral side 14 and medial side 15 extend through each of regions 11-13 and correspond with opposite sides of footwear 10. Regions 11-13 and sides 14-15 are not intended to demarcate precise areas of footwear 10. Rather, regions 11-13 and sides 14-15 are intended to represent general areas of footwear 10 to aid in the following discussion. In addition to footwear 10, regions 11-13 and sides 14-15 may also be applied to sole structure 20, upper 30, and individual elements thereof.

Sole structure 20 is secured to upper 30 and extends between the foot and the ground when footwear 10 is worn. The primary elements of sole structure 20 are a midsole 21, an outsole 22, and a sockliner 23. Midsole 21 is secured to a lower surface of upper 30 and may be formed from a compressible polymer foam element (e.g., a polyurethane or ethylvinylacetate foam) that attenuates ground reaction forces (i.e., provides cushioning) when compressed between the foot and the ground during walking, running, or other ambulatory activities. In further configurations, midsole 21 may incorporate fluid-filled chambers, plates, moderators, or other elements that further attenuate forces, enhance stability, or influence motions of the foot, or midsole 21 may be primarily formed from a fluid-filled chamber. Outsole 22 is secured to a lower surface of midsole 21 and may be formed from a wear-resistant rubber material that is textured to impart traction. Sockliner 23 is located within upper 30 and is positioned to extend under a lower surface of the foot. Although this configuration for sole structure 20 provides an example of a sole structure that may be used in connection with upper 30, a variety of other conventional or nonconventional configurations for sole structure 20 may also be utilized. Accordingly, the configuration and features of sole structure 20 or any sole structure utilized with upper 30 may vary considerably.

Upper 30 is secured to sole structure 20 and includes a foundation element 31 that defines a void within footwear 10 for receiving and securing a foot relative to sole structure 20. More particularly, an interior surface of foundation element 31 forms at least a portion of the void within upper 30. As depicted, foundation element 31 is shaped to accommodate the foot and extends along the lateral side of the foot, along the medial side of the foot, over the foot, around the heel, and under the foot. In other configurations, foundation element 31 may only extend over or along a portion of the foot, thereby forming only a portion of the void within upper 30. Access to the void within foundation element 31 is provided by an ankle opening 32 located in at least heel region 13. A lace 33 extends through various lace apertures 34, which extend through foundation element 31, and permits the wearer to modify dimensions of upper 30 to accommodate the proportions of the foot. More particularly, lace 33 permits the wearer to tighten upper 30 around the foot, and lace 33 permits the wearer to loosen upper 30 to facilitate entry and removal of the foot from the void (i.e., through ankle opening 32). In addition, foundation element 31 may include a tongue (not depicted) that extends under lace 33.

Figure 3:
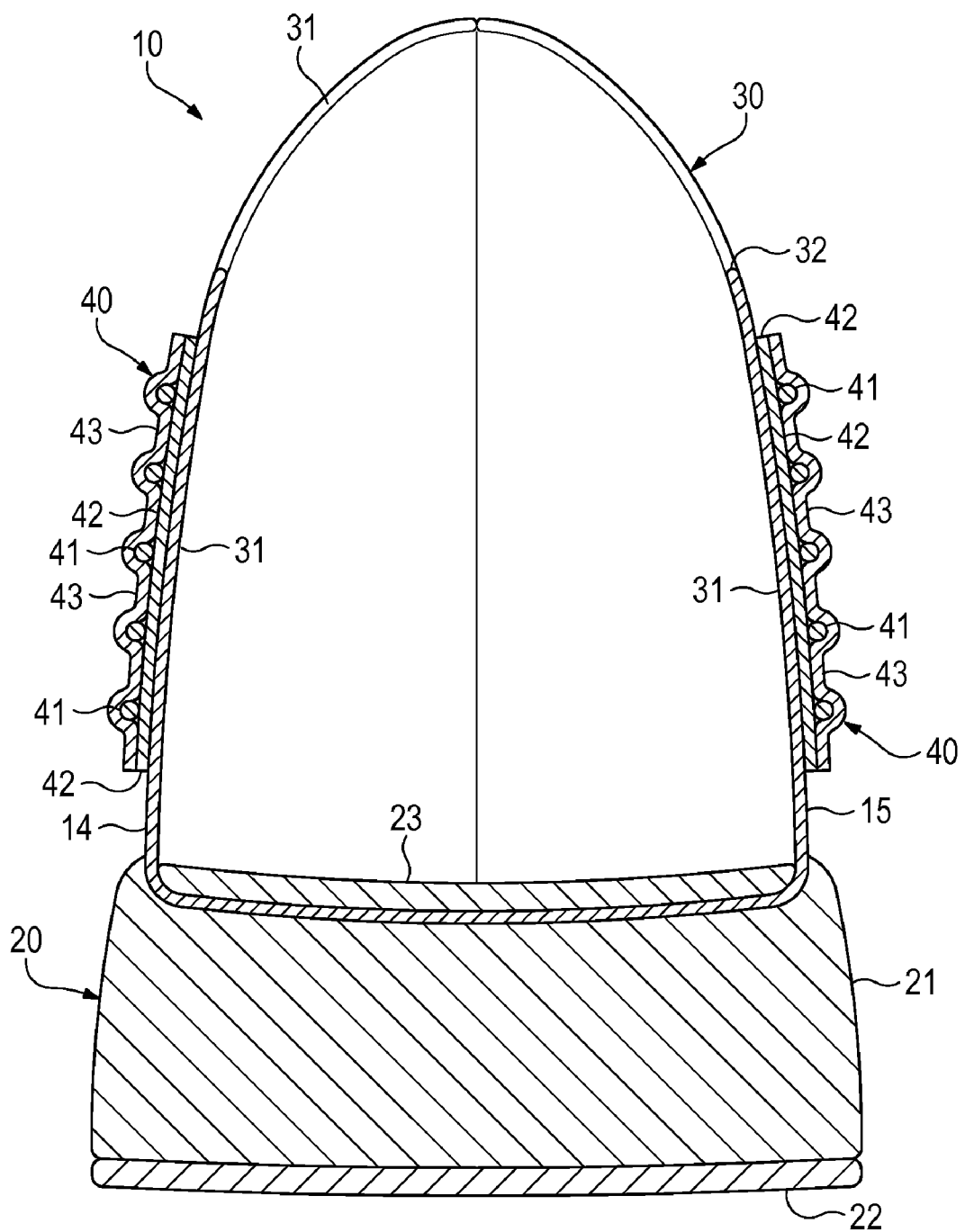
FIG. 3 is a cross-sectional view of the article of footwear, as defined by section line 3-3 in FIG. 2.

The various portions of foundation element 31 may be formed from one or more of a plurality of material elements (e.g., textiles, polymer sheets, foam layers, leather, synthetic leather) that are stitched or bonded together to form the void within footwear 10. Referring to FIG. 3, foundation element 31 is depicted as being formed from a single material layer, but may also be formed from multiple material layers that each impart different properties. As noted above, foundation element 31 extends along the lateral side of the foot, along the medial side of the foot, over the foot, around the heel, and under the foot. Moreover, an interior surface of foundation element 31 contacts the foot (or a sock worn over the foot), whereas an exterior surface of foundation element 31 forms at least a portion of an exterior surface of upper 30. Although the material elements forming foundation element 31 may impart a variety of properties to upper 30, a tensile element 40 is secured to each of lateral side 14 and medial side 15. Referring to FIG. 3, for example, tensile element 40 is secured to the exterior surface of foundation element 31. A majority of the exterior surface of upper 30 is formed, therefore, by the combination of foundation element 31 and tensile element 40.

Tensile element 40 incorporates various strands 41. Referring to FIGS. 1 and 2, strands 41 extend in a generally (a) vertical direction between lace apertures 34 and sole structure 20 and (b) horizontal direction between forefoot region 11 and heel region 13 on both of lateral side 14 and medial side 15. Referring also to FIG. 3, the various strands 41 are located between a base layer 42 and a cover layer 43. Whereas base layer 42 is secured to the exterior surface of foundation element 31, cover layer 43 forms a portion of the exterior surface of upper 30.

During walking, running, or other ambulatory activities, a foot within the void in footwear 10 may tend to stretch upper 30. That is, many of the material elements forming upper 30, including foundation element 31, may stretch when placed in tension by movements of the foot. Although strands 41 may also stretch, strands 41 generally stretch to a lesser degree than the other material elements forming upper 30 (e.g., foundation element 31, base layer 42, and cover layer 43). Each of strands 41 may be located, therefore, to form structural components in upper 30 that resist stretching in specific directions or reinforce locations where forces are concentrated. As an example, the various strands 41 that extend between lace apertures 34 and sole structure 20 resist stretch in the medial-lateral direction (i.e., in a direction extending around upper 30). These strands 41 are also positioned adjacent to and radiate outward from lace apertures 34 to resist stretch due to tension in lace 33. As another example, the various strands 41 that extend between forefoot region 11 and heel region 13 resist stretch in a longitudinal direction (i.e., in a direction extending through each of regions 11-13). Accordingly, strands 41 are located to form structural components in upper 30 that resist stretch.

Tensile Element Configuration

Figure 6:
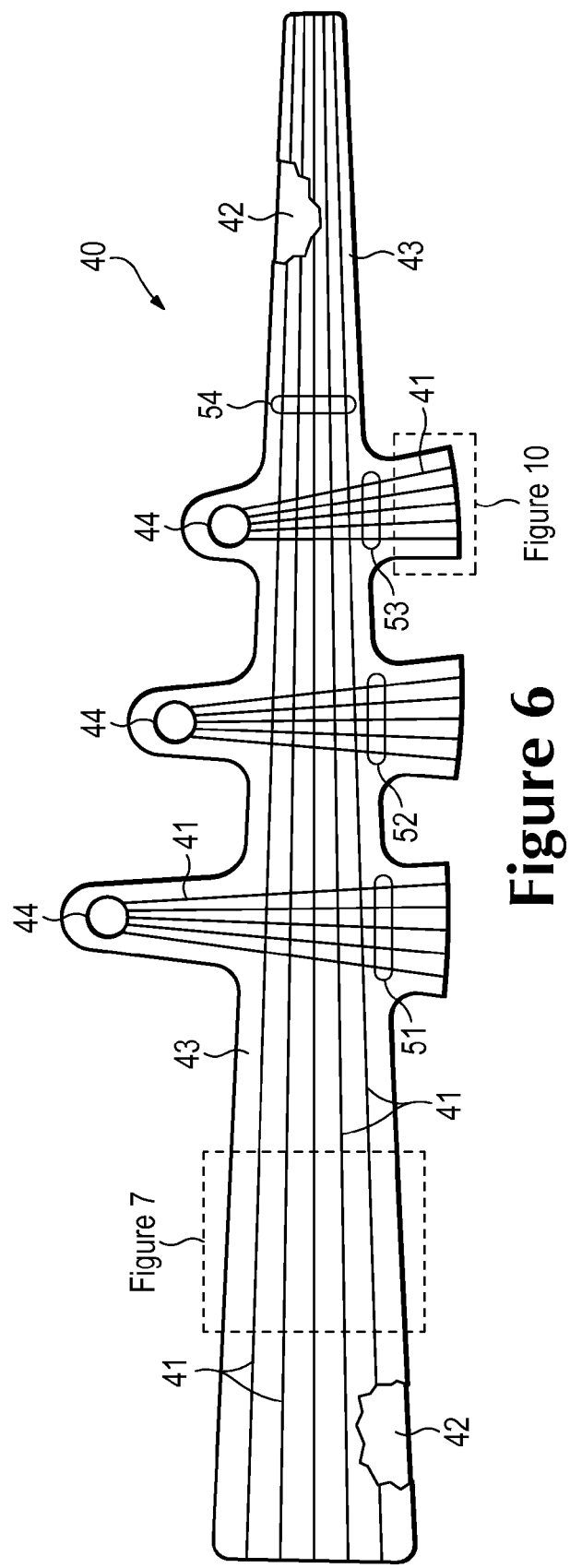
FIG. 6 is a plan view of a tensile element utilized in an upper of the article of footwear.
Figure 7:
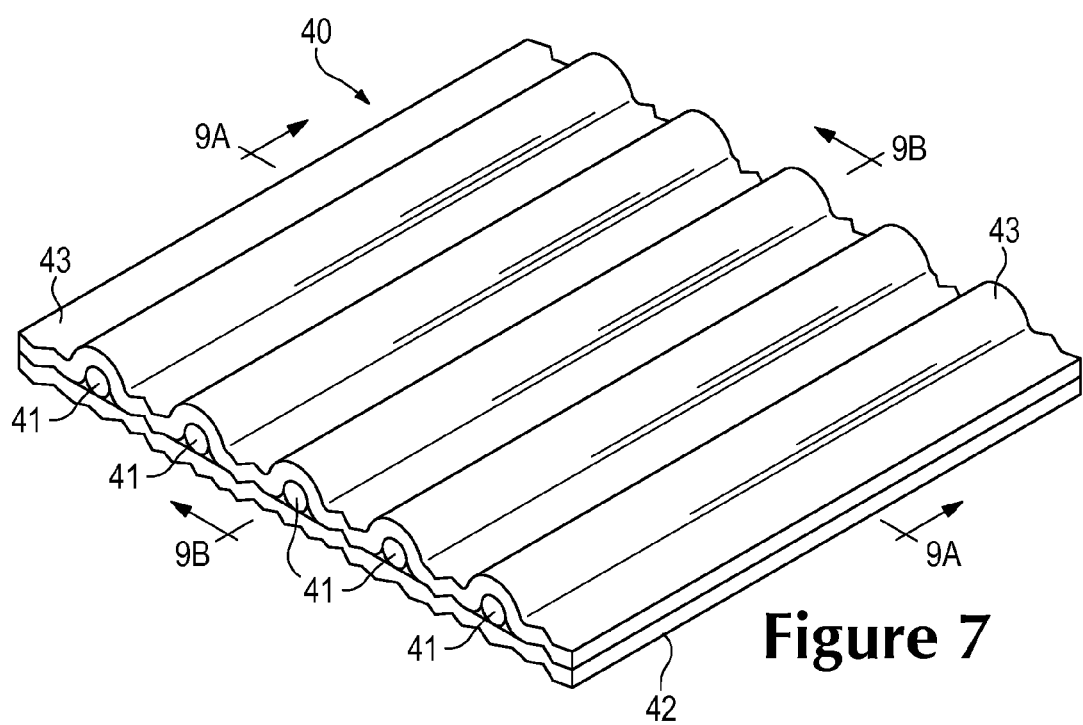
FIG. 7 is a perspective view of a first portion of the tensile element, as defined in FIG. 6.
Figure 8:
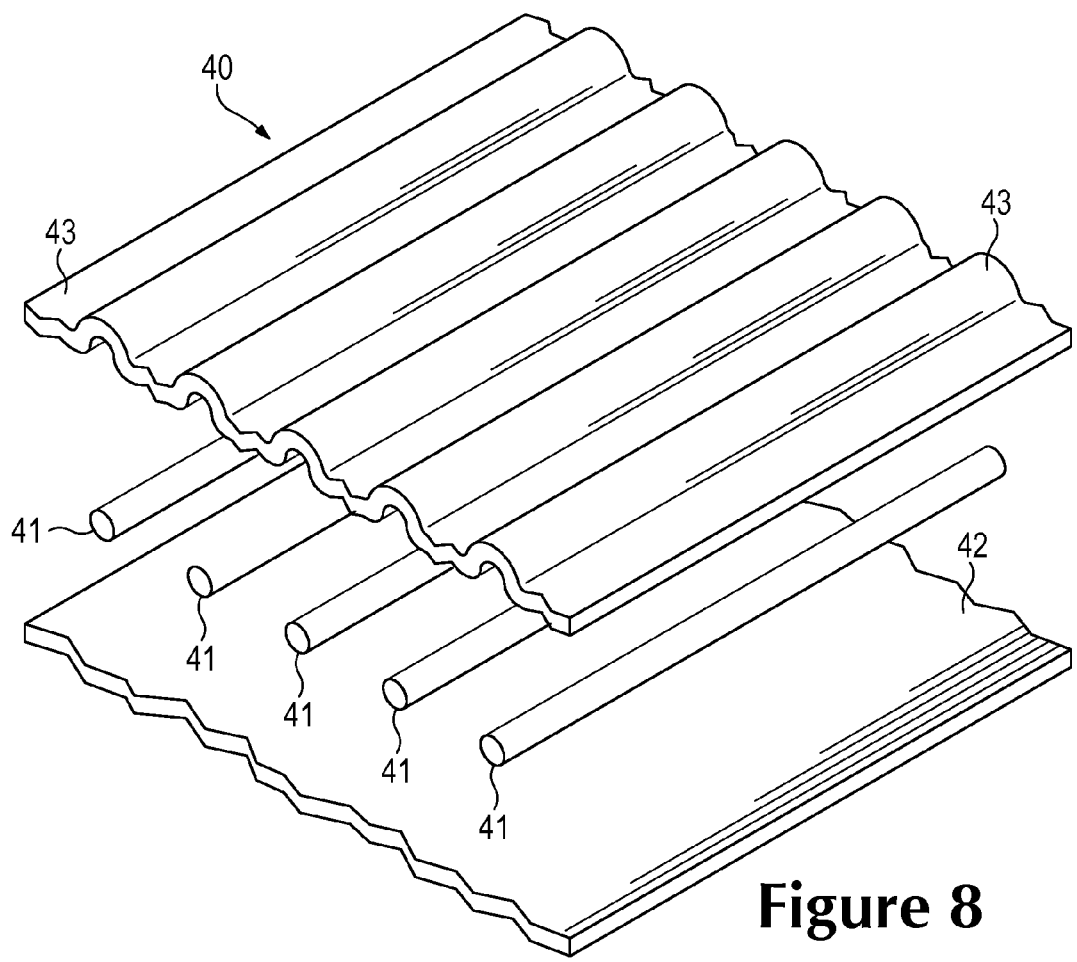
FIG. 8 is an exploded perspective view of the first portion of the tensile element.
Figure 9A:
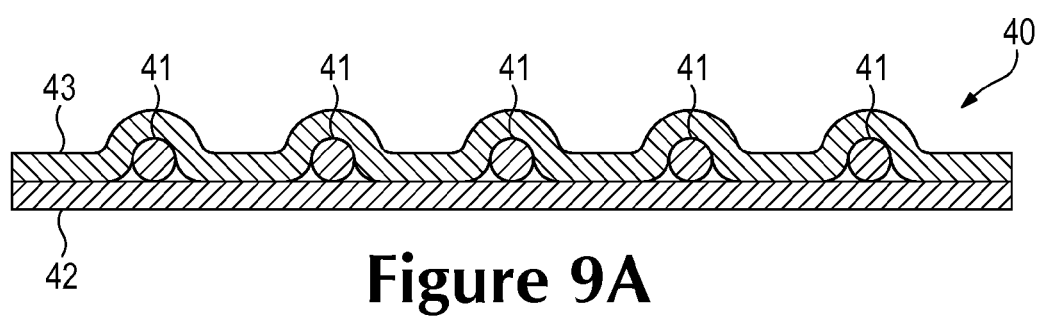
FIGS. 9A and 9B are a cross-sectional views of the first portion of the tensile element, as defined by section lines 9A and 9B in FIG. 7.
Figure 9B:
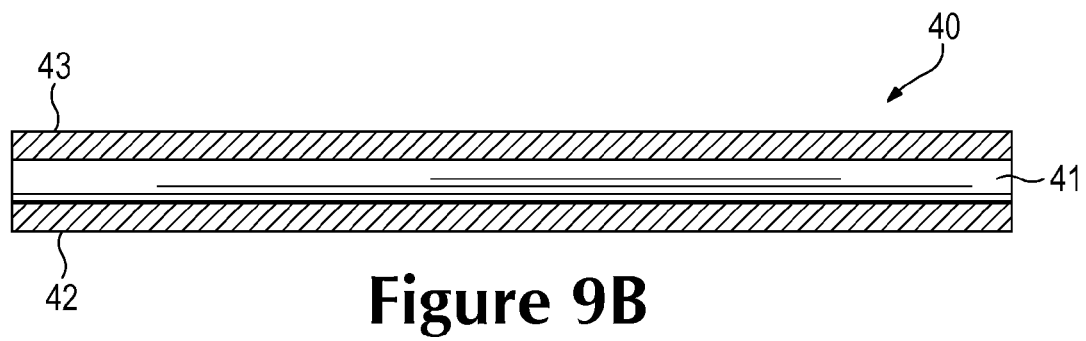
Figure 10:
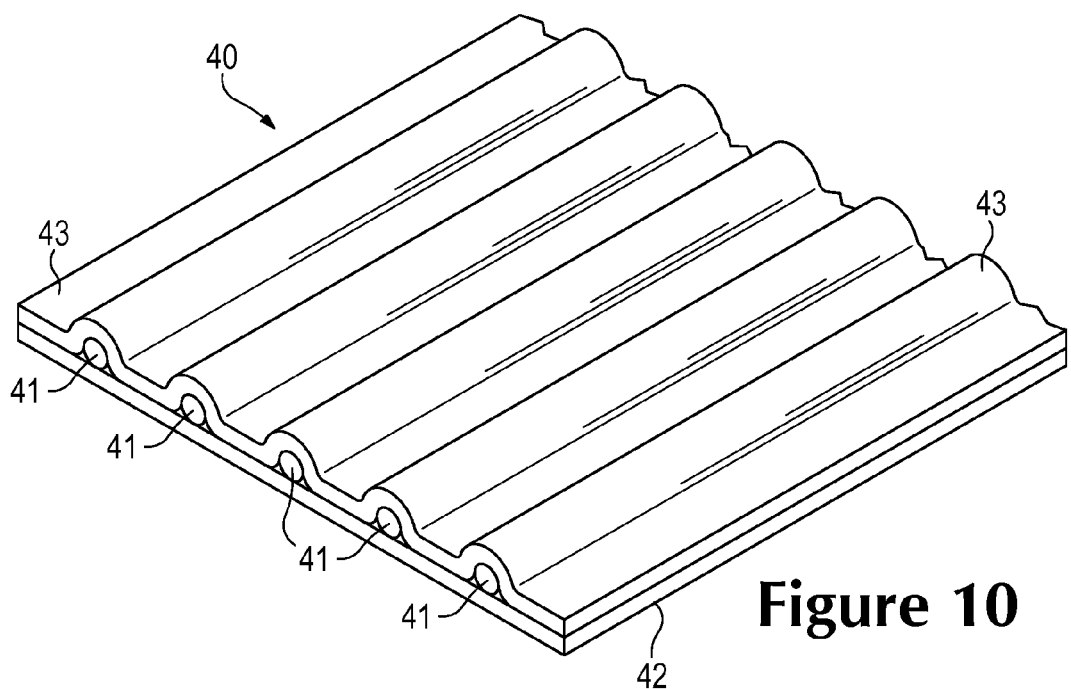
FIG. 10 is a perspective view of a second portion of the tensile element, as defined in FIG. 6.

Tensile element 40 is depicted individually in FIG. 6. Additionally, portions of tensile element 40 are depicted in each of FIGS. 7-10. A substantially similar tensile element 40 may also be utilized in connection with medial side 15. In some configurations of footwear 10, tensile element 40 may only extend through a portion of lateral side 14 (e.g., limited to midfoot region 12) or may be expanded to form a majority of lateral side 14 and medial side 15. That is, a single element having the general configuration of tensile element 40 and including strands 41 and layers 42 and 43 may extend through both lateral side 14 and medial side 15. In other configurations, additional elements may be joined to tensile element 40 to form portions of lateral side 14.

Tensile element 40 includes strands 41, base layer 42, and cover layer 43, with strands 41 being positioned between layers 42 and 43. Strands 41 lie adjacent to a surface of base layer 42 and substantially parallel to the surface of base layer 42. In general, strands 41 also lie adjacent to a surface of cover layer 43 and substantially parallel to the surface of cover layer 43. As discussed above, strands 41 form structural components in upper 30 that resist stretch. By being substantially parallel to the surfaces of base layer 42 and cover layer 43, strands 41 resist stretch in directions that correspond with the planes of layers 42 and 43. Although strands 41 may extend through base layer 42 (e.g., as a result of stitching) in some locations, areas where strands 41 extend through base layer 42 may permit stretch, thereby reducing the overall ability of strands 41 to limit stretch. As a result, each of strands 41 generally lie adjacent to a surface of base layer 42 and substantially parallel to the surface of base layer 42 for distances of at least twelve millimeters, and may lie adjacent to the surface of base layer 42 and substantially parallel to the surface of base layer 42 throughout distances of at least five centimeters or more.

Base layer 42 and cover layer 43 are depicted as being coextensive with each other. That is, layers 42 and 43 may have the same shape and size, such that edges of base layer 42 correspond and are even with edges of cover layer 43. In some manufacturing processes, (a) strands 41 are located upon base layer 42, (b) cover layer 43 is bonded to base layer 42 and strands 41, and (c) tensile element 40 is cut from this combination to have the desired shape and size, thereby forming common edges for base layer 42 and cover layer 43. In this process, ends of strands 41 may also extend to edges of layers 42 and 43. Referring to FIG. 6, for example, ends of strands 41 are located at the edges of layers 42 and 43 on opposite sides of tensile element 40. Also referring to FIG. 10, ends of strands 41 are depicted as being located at the edges of layers 42 and 43. Accordingly, edges of layers 42 and 43, as well as ends of strands 41, may all be positioned at edges of tensile element 40.

Strands 41 may be formed from any generally one-dimensional material. As utilized with respect to the present invention, the term "one-dimensional material" or variants thereof is intended to encompass generally elongate materials exhibiting a length that is substantially greater than a width and a thickness. Accordingly, suitable materials for strands 41 include various filaments, fibers, yarns, threads, cables, or ropes that are formed from rayon, nylon, polyester, polyacrylic, silk, cotton, carbon, glass, aramids (e.g., para-aramid fibers and meta-aramid fibers), ultra high molecular weight polyethylene, liquid crystal polymer, copper, aluminum, and steel. Whereas filaments have an indefinite length and may be utilized individually as strands 41, fibers have a relatively short length and generally go through spinning or twisting processes to produce a strand of suitable length. An individual filament utilized in strands 41 may be formed form a single material (i.e., a monocomponent filament) or from multiple materials (i.e., a bicomponent filament). Similarly, different filaments may be formed from different materials. As an example, yarns utilized as strands 41 may include filaments that are each formed from a common material, may include filaments that are each formed from two or more different materials, or may include filaments that are each formed from two or more different materials. Similar concepts also apply to threads, cables, or ropes. The thickness of strands 41 may also vary significantly to range from 0.03 millimeters to more than 5 millimeters, for example. Although one-dimensional materials will often have a cross-section where width and thickness are substantially equal (e.g., a round or square cross-section), some one-dimensional materials may have a width that is greater than a thickness (e.g., a rectangular, oval, or otherwise elongate cross-section). Despite the greater width, a material may be considered one-dimensional if a length of the material is substantially greater than a width and a thickness of the material.

Each of base layer 42 and cover layer 43 may be formed from any generally two-dimensional material. As utilized with respect to the present invention, the term "two-dimensional material" or variants thereof is intended to encompass generally flat materials exhibiting a length and a width that are substantially greater than a thickness. Accordingly, suitable materials for base layer 42 and cover layer 43 include various textiles, polymer sheets, or combinations of textiles and polymer sheets, for example. Textiles are generally manufactured from fibers, filaments, or yarns that are, for example, either (a) produced directly from webs of fibers by bonding, fusing, or interlocking to construct non-woven fabrics and felts or (b) formed through a mechanical manipulation of yarn to produce a woven or knitted fabric. The textiles may incorporate fibers that are arranged to impart one-directional stretch or multi-directional stretch, and the textiles may include coatings that form a breathable and water-resistant barrier, for example. The polymer sheets may be extruded, rolled, or otherwise formed from a polymer material to exhibit a generally flat aspect. Two-dimensional materials may also encompass laminated or otherwise layered materials that include two or more layers of textiles, polymer sheets, or combinations of textiles and polymer sheets. In addition to textiles and polymer sheets, other two-dimensional materials may be utilized for base layer 42 and cover layer 43. Although two-dimensional materials may have smooth or generally untextured surfaces, some two-dimensional materials will exhibit textures or other surface characteristics, such as dimpling, protrusions, ribs, or various patterns, for example. Despite the presence of surface characteristics, two-dimensional materials remain generally flat and exhibit a length and a width that are substantially greater than a thickness. In some configurations, mesh materials or perforated materials may be utilized for either or both of layers 42 and 43 to impart greater breathability or air permeability.

Although base layer 42 and cover layer 43 may be formed from a variety of materials, incorporating a thermoplastic polymer material (e.g., thermoplastic polyurethane) into one or both of layers 42 and 43 may facilitate bonding between layers 42 and 43, as well as securing strands 41 between layers 42 and 43. As examples, base layer 42 may be (a) a thermoplastic polymer sheet, (b) a textile that includes filaments or fibers formed from a thermoplastic polymer material, or (c) a combination of a textile and a thermoplastic polymer sheet. In any of these configurations, heating the thermoplastic polymer material of base layer 42 may form a bond with both strands 41 and cover layer 42. In other configurations, cover layer 43 may incorporate the thermoplastic polymer material. An advantage of incorporating a thermoplastic polymer material into base layer 42, however, is that the thermoplastic polymer material may also be utilized to join tensile element 40 to foundation element 31. That is, a thermoplastic polymer material in base layer 42 may be utilized to form bonds between (a) base layer 42 and cover layer 43, (b) base layer 42 and strands 41, and (c) base layer 42 and foundation element 31. Concepts relating to joining the various elements of tensile element 40, as well as joining tensile element 40 to foundation element 31, will be discussed in greater detail below.

Figure 4:
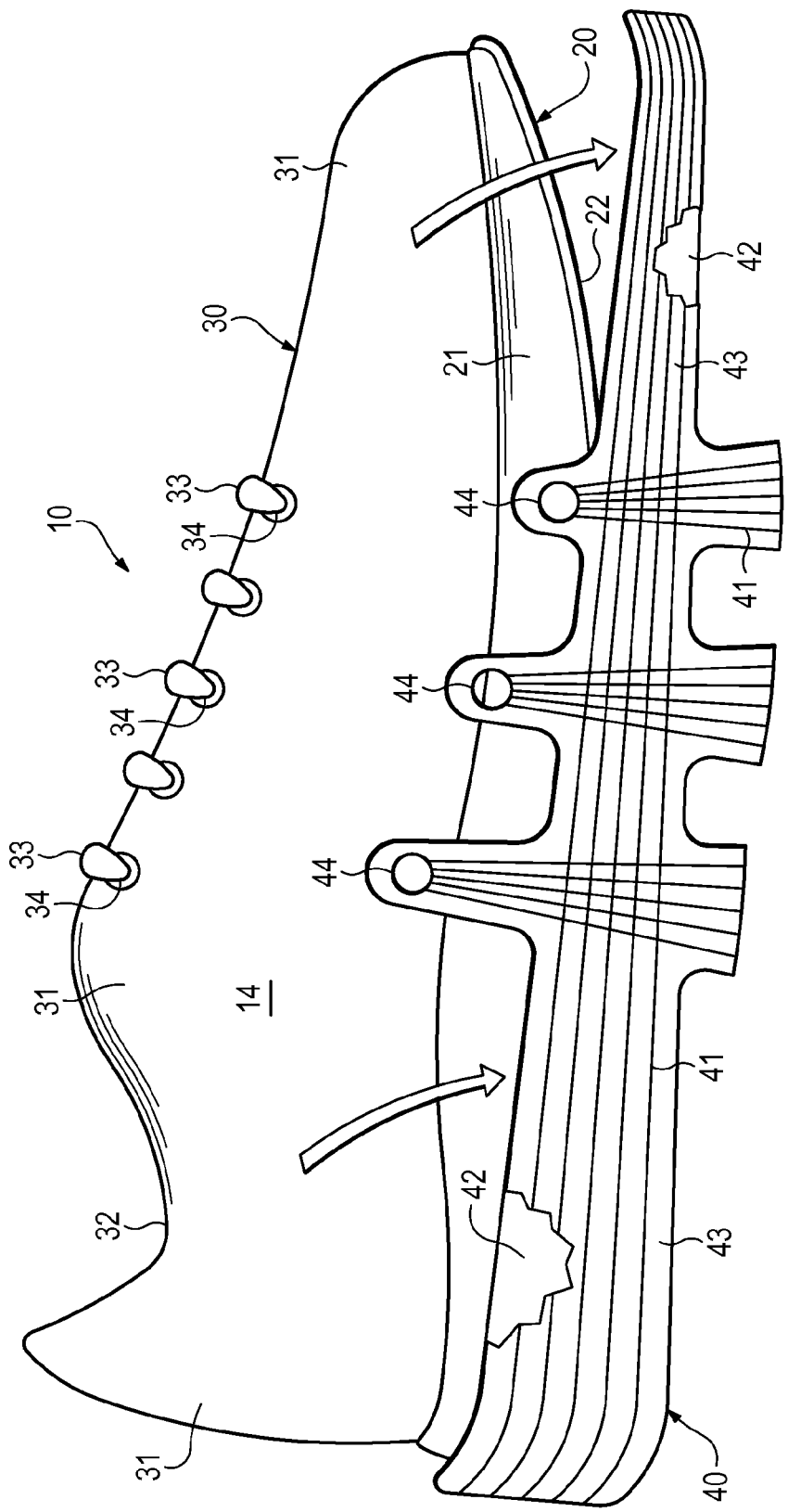
FIG. 4 is an exploded lateral side elevational view of the article of footwear.
Figure 5:
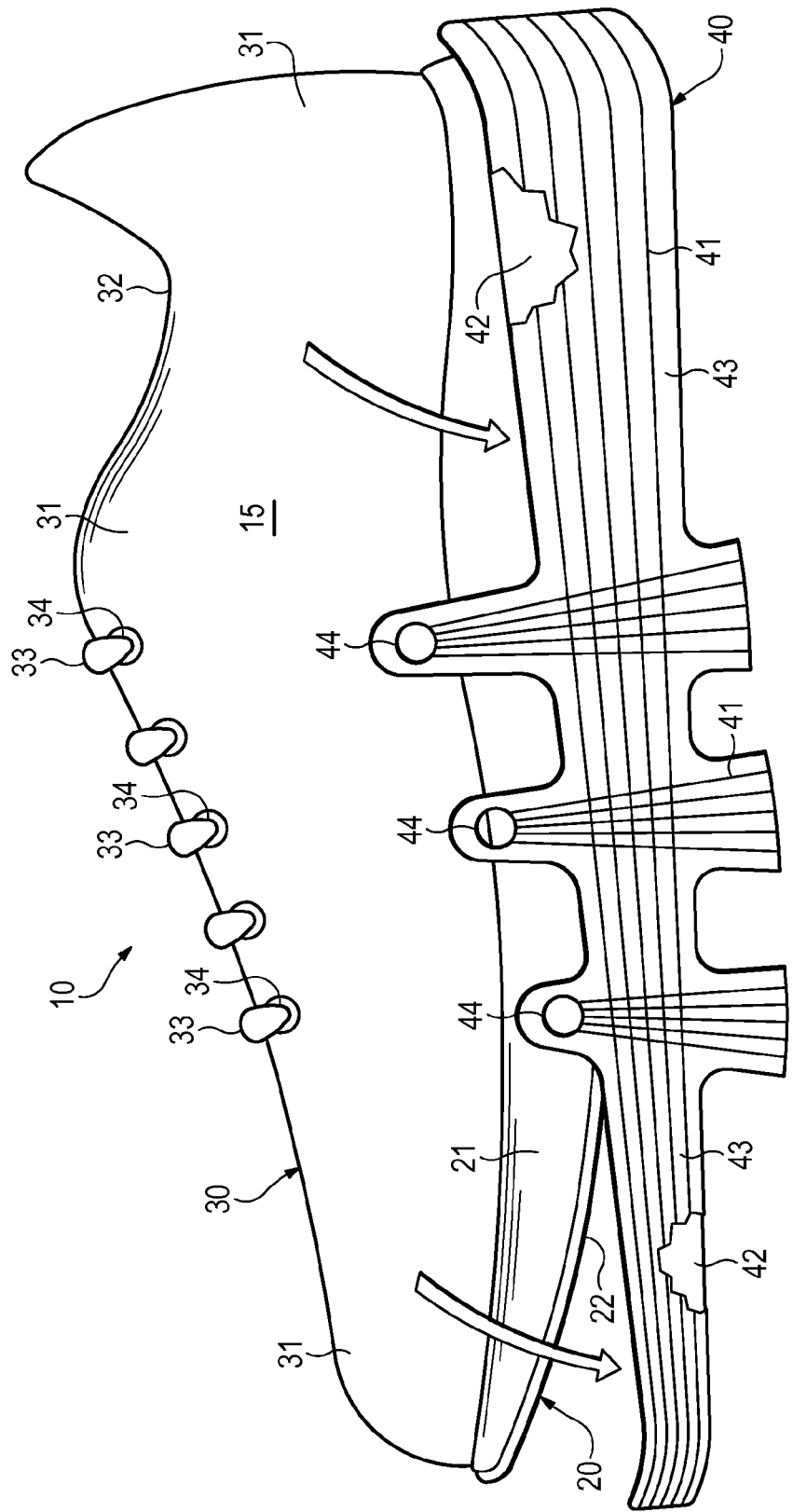
FIG. 5 is an exploded medial side elevational view of the article of footwear.

Various strands 41 extend downward from lace apertures 34, which extend through foundation element 31. Portions of tensile element 40 adjacent to lace apertures 34 may also define various lace apertures 44, as best depicted in FIGS. 4 and 6, to provide areas for receiving lace 33.

Based upon the above discussion, tensile element 40 generally includes at least two layers 42 and 43 with strands 41 located between. Although strands 41 may pass through one of layers 42 and 43, strands 41 generally lie adjacent to surfaces of layers 42 and 43 and substantially parallel to the surfaces layers 42 and 43 for more than twelve millimeters and even more than five centimeters. Whereas a variety of one dimensional materials may be used for strands 41, one or more two dimensional materials may be used for layers 42 and 43. Moreover, when base layer 42 includes a thermoplastic polymer material, heating of the thermoplastic polymer material may cause bonding between base layer 42 and other elements of upper 30.

Structural Components

A conventional upper may be formed from multiple material layers that each impart different properties to various areas of the upper. During use, an upper may experience significant tensile forces, and one or more layers of material are positioned in areas of the upper to resist the tensile forces. That is, individual layers may be incorporated into specific portions of the upper to resist tensile forces that arise during use of the footwear. As an example, a woven textile may be incorporated into an upper to impart stretch resistance in the longitudinal direction. A woven textile is formed from yarns that interweave at right angles to each other. If the woven textile is incorporated into the upper for purposes of longitudinal stretch-resistance, then only the yarns oriented in the longitudinal direction will contribute to longitudinal stretch-resistance, and the yarns oriented orthogonal to the longitudinal direction will not generally contribute to longitudinal stretch-resistance. Approximately one-half of the yarns in the woven textile are, therefore, superfluous to longitudinal stretch-resistance. As an extension of this example, the degree of stretch-resistance required in different areas of the upper may vary. Whereas some areas of the upper may require a relatively high degree of stretch-resistance, other areas of the upper may require a relatively low degree of stretch-resistance. Because the woven textile may be utilized in areas requiring both high and low degrees of stretch-resistance, some of the yarns in the woven textile are superfluous in areas requiring the low degree of stretch-resistance. In this example, the superfluous yarns add to the overall mass of the footwear, without adding beneficial properties to the footwear. Similar concepts apply to other materials, such as leather and polymer sheets, that are utilized for one or more of wear-resistance, flexibility, air-permeability, cushioning, and moisture-wicking, for example.

As a summary of the above discussion, materials utilized in the conventional upper formed from multiple layers of material may have superfluous portions that do not significantly contribute to the desired properties of the upper. With regard to stretch-resistance, for example, a layer may have material that imparts (a) a greater number of directions of stretch-resistance or (b) a greater degree of stretch-resistance than is necessary or desired. The superfluous portions of these materials may, therefore, add to the overall mass and cost of the footwear, without contributing significant beneficial properties.

In contrast with the conventional layered construction discussed above, upper 30 is constructed to minimize the presence of superfluous material. Foundation element 31 provides a covering for the foot, but may exhibit a relatively low mass. Tensile element 40, which includes the various strands 41, is positioned to provide stretch-resistance in particular directions and locations, and the number of strands 41 is selected to impart the desired degree of stretch-resistance. Accordingly, the orientations, locations, and quantity of strands 41 are selected to provide structural components that are tailored to a specific purpose.

For purposes of reference in the following discussion, four strand groups 51-54 are identified in FIG. 6. Strand group 51 includes the various strands 41 extending downward from the lace aperture 34 closest to ankle opening 31. Similarly, strand groups 52 and 53 include the various strands 41 extending downward from other lace apertures 34. Additionally, strand group 54 includes the various strands 41 that extend between forefoot region 11 and heel region 13.

The various strands 41 that extend between lace apertures 34 and 44 and sole structure 20 resist stretch in the medial-lateral direction, which may be due to tension in lace 33. More particularly, the various strands 41 in strand group 51 cooperatively resist stretch from the portion of lace 32 that extends through the lace aperture 44 closest to ankle opening 31. Strand group 51 also radiates outward when extending away from lace aperture 44, thereby distributing the forces from lace 33 over an area of upper 30. Similar concepts also apply to strand groups 52 and 53. The various strands 41 that extend between forefoot region 11 and heel region 13 resist stretch in the longitudinal direction. More particularly, the various strands 41 in strand group 54 cooperatively resist stretch in the longitudinal direction, and the number of strands 41 in strand group 54 are selected to provide a specific degree of stretch-resistance through regions 11-13. Additionally, strands 41 in strand group 54 also cross over each of the strands 41 in strand groups 51-53 to impart a relatively continuous stretch resistance through regions 11-13.

Depending upon the specific configuration of footwear 10 and the intended use of footwear 10, layers 42 and 43 may be non-stretch materials, materials with one-directional stretch, or materials with two-directional stretch, for example. In general, forming layers 42 and 43 from materials with two-directional stretch provides upper 30 with a greater ability to conform with the contours of the foot, thereby enhancing the comfort of footwear 10. In configurations where layers 42 and 43 have two-directional stretch, the combination of strands 41 with layers 42 and 43 effectively varies the stretch characteristics of upper 30 in specific locations. With regard to upper 30, the combination of strands 41 with layers 42 and 43 having two-directional stretch forms zones in upper 30 that have different stretch characteristics, and the zones include (a) first zones where no strands 41 are present and upper 30 exhibits two-directional stretch, (b) second zones where strands 41 are present and do not cross each other, and upper 30 exhibits one-directional stretch in a direction that is orthogonal (i.e., perpendicular) to strands 41, and (c) third zones where strands 41 are present and cross each other, and upper 30 exhibits substantially no stretch or limited stretch. Accordingly, the overall stretch characteristics of particular areas of upper 30 may be controlled by presence of strands 41 and whether strands 41 cross each other.

Based upon the above discussion, strands 41 may be utilized to form structural components in upper 30. In general, strands 41 resist stretch to limit the overall stretch in upper 30. Strands 41 may also be utilized to distribute forces (e.g., forces from lace 33) to different areas of upper 30. Accordingly, the orientations, locations, and quantity of strands 41 are selected to provide structural components that are tailored to a specific purpose. Moreover, the orientations of strands 41 relative to each other and whether strands 41 cross each other may be utilized to control the directions of stretch in different portions of upper 30.

Manufacturing Process

A variety of methods may be utilized to manufacture upper 30, including tensile element 40. As an example, an embroidery process may be utilized to locate strands 41 relative to base layer 42. Once strands 41 are positioned, cover layer 43 may be bonded to base layer 42 and strands 41, thereby securing strands 41 within tensile element 40. This general process is described in detail in U.S. patent application Ser. No. 11/442,679, which was filed in the U.S. Patent and Trademark Office on 25 May 2006 and entitled Article Of Footwear Having An Upper With Thread Structural Elements, such prior application being entirely incorporated herein by reference. As an alternative to an embroidery process, other stitching processes may be utilized to locate strands 41 relative to base layer 42, such as computer stitching. Additionally, processes that involve winding strands 41 around pegs on a frame around base layer 42 may be utilized to locate strands 41 over base layer 42. Accordingly, a variety of methods may be utilized to locate strands 41 relative to base layer 42.

Figure 11A:
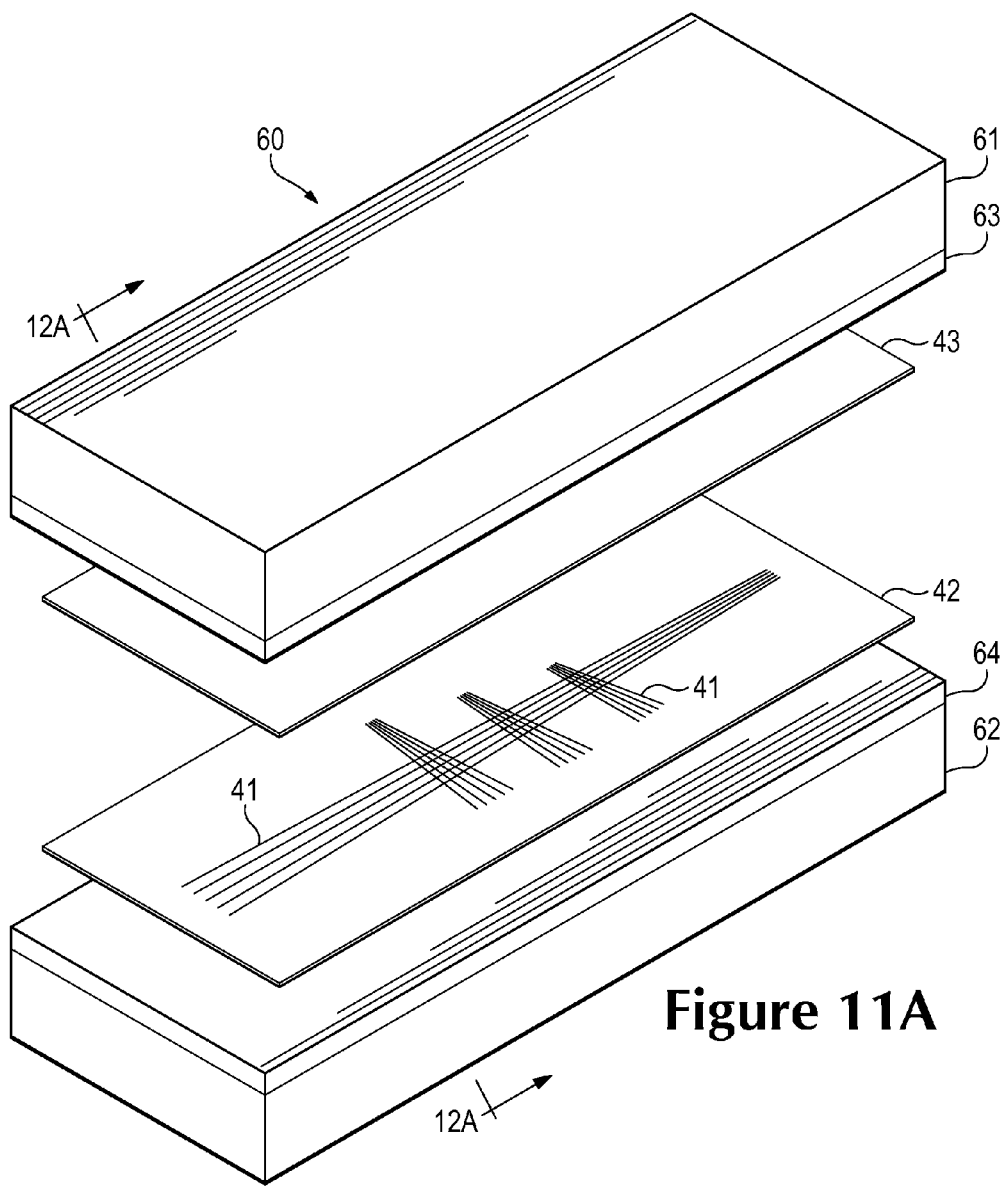
FIGS. 11A-11E are schematic perspective views of a process for manufacturing the tensile element.
Figure 12A:
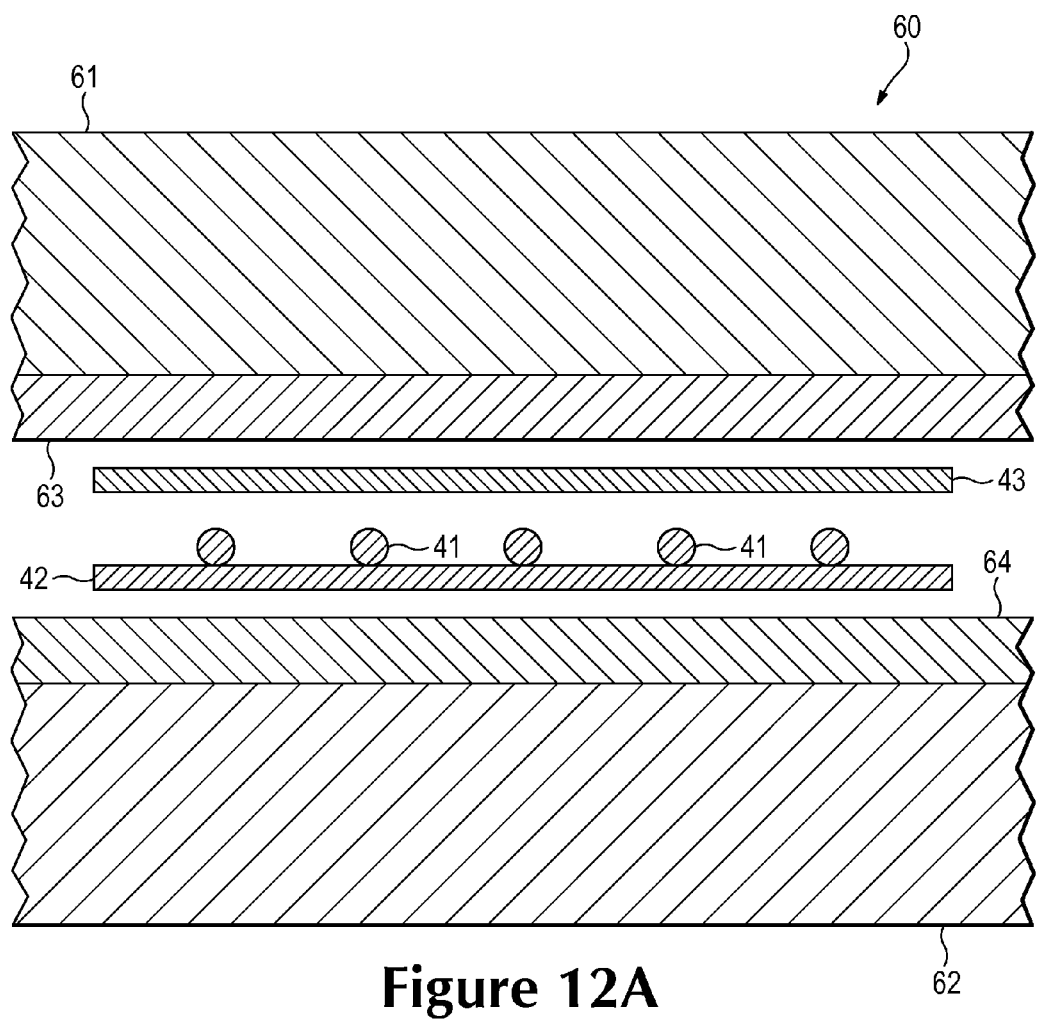
FIGS. 12A-12C are cross-sectional views of the process for manufacturing the tensile element, as defined by section lines 12A-12C in FIGS. 11A-11C.

A molding process that may be utilized to form tensile element 40 will now be discussed. With reference to FIGS. 11A and 12A, a mold 60 is depicted as including a first mold portion 61 and a second mold portion 62. Each of mold portions 61 and 62 have facing surfaces that, as described below, compress strands 41 and layers 42 and 43. The surfaces of mold portions 61 and 62 that compress the components of tensile element 40 each include materials with different densities and hardnesses. More particularly, first mold portion 61 includes a material 63 and second mold portion 62 includes a material 64. In comparison, material 63 has a lesser hardness and a lesser density than material 64 and, as a result, material 63 compresses more easily than material 64. As an example of suitable materials, material 63 may be silicone with a hardness of 15 on the Shore A hardness scale, whereas material 64 may be silicone with a hardness of 70 on the Shore A hardness scale. In some configurations of mold 60, material 63 may have a Shore A hardness less than 40, whereas material 64 may have a Shore A hardness greater than 40. In other configurations of mold 60, material 63 may have a Shore A hardness between 5 and 20, whereas material 64 may have a Shore A hardness between 40 and 80. A variety of other materials may also be utilized, including various polymers and foams, such as ethylvinylacetate and rubber. An advantage to silicone, however, relates to compression set. More particularly, silicone may go through repeated molding operations without forming indentations or other surface irregularities due to repeated compressions.

Figure 12B:
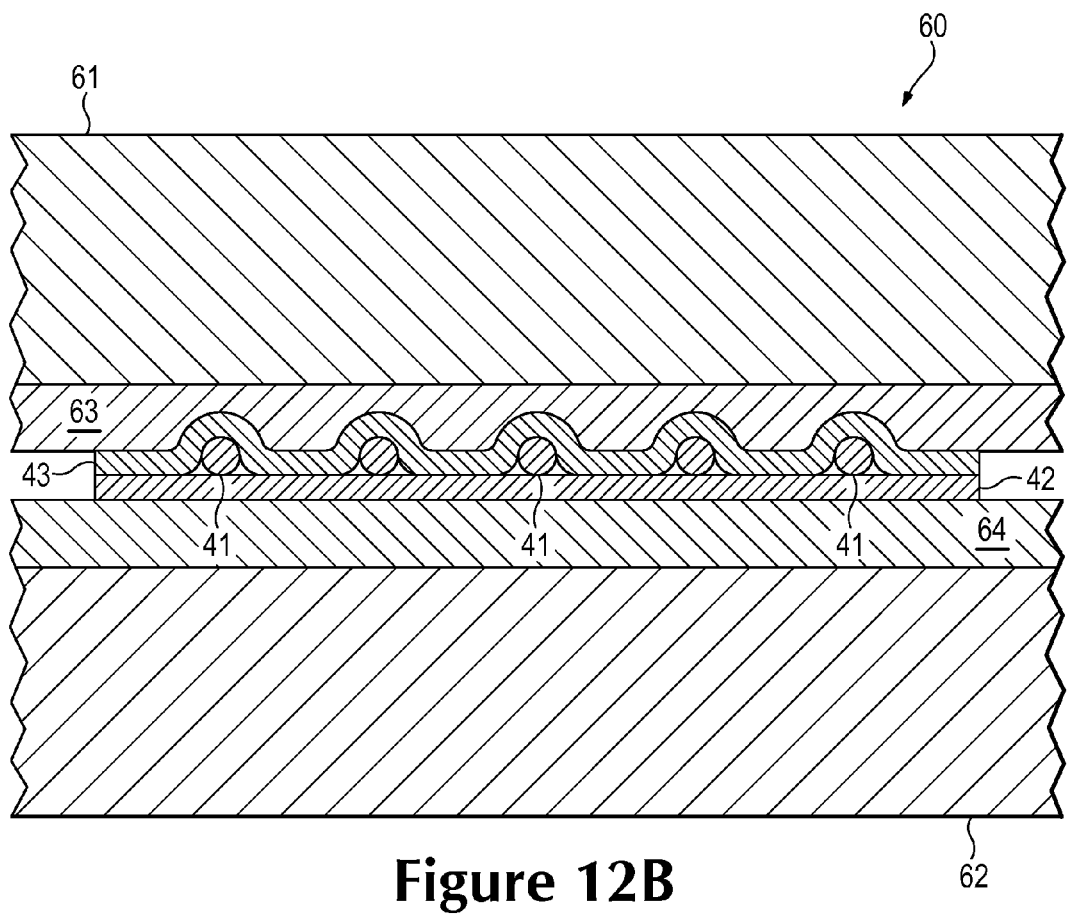
Figure 12C:
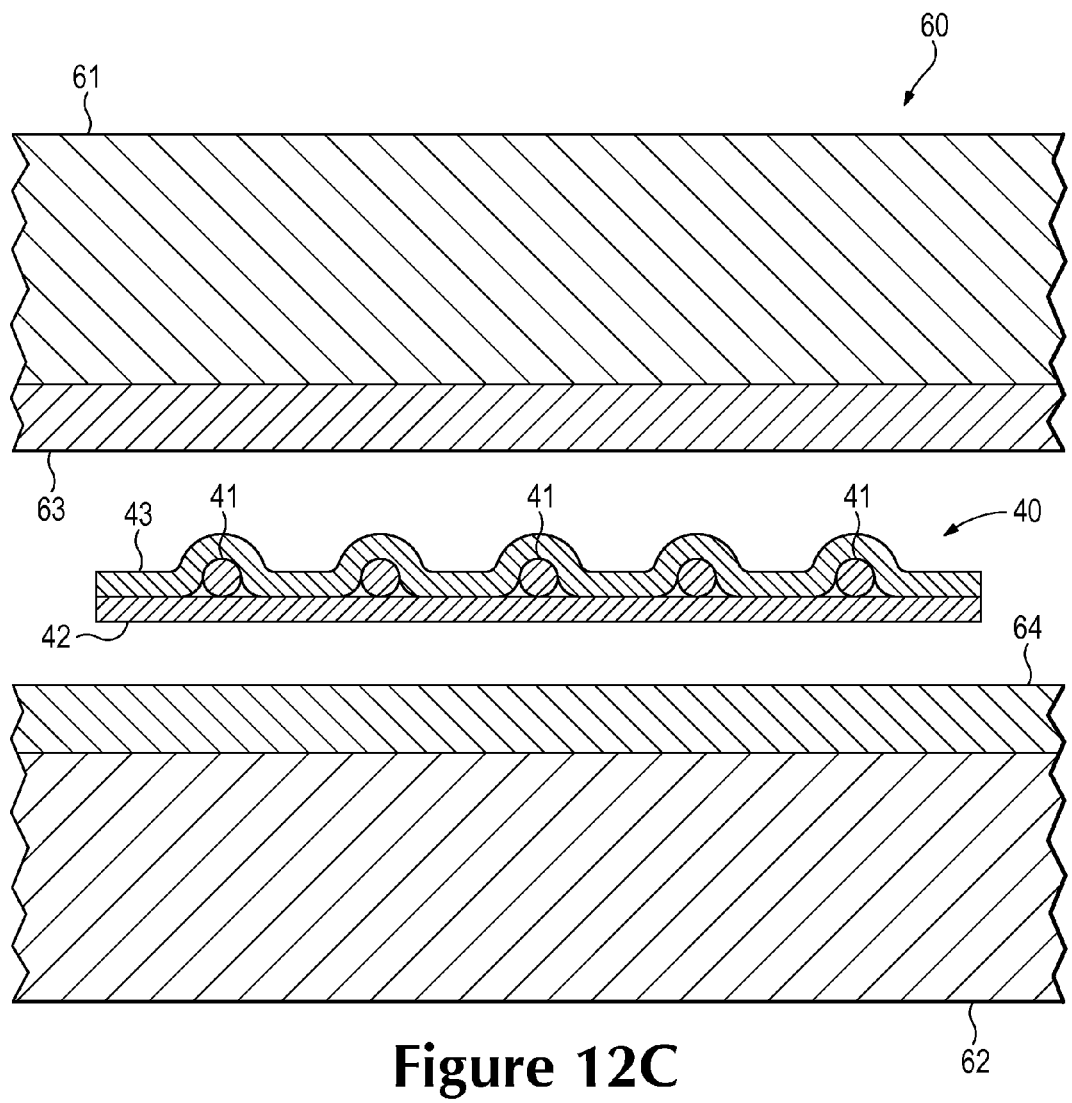

In addition to differences in the densities and hardnesses of materials 63 and 64, the thicknesses may also vary. Referring to FIGS. 12A-12C, for example, material 63 has greater thickness than material 64. In configurations where material 63 is silicone with a hardness of 15 on the Shore A hardness scale and material 64 is silicone with a hardness of 70 on the Shore A hardness scale, material 63 may have a thickness of 5 millimeters and material 64 may have a thickness of 2 millimeters. In other configurations of mold 60, material 63 may have a thickness between 3 and 10 millimeters or more, and material 64 may have a thickness between 1 and 4 millimeters.

Mold 60 is utilized to form tensile element 40 from strands 41 and layers 42 and 43. Initially, the components of tensile element 40 are located between mold portions 61 and 62, as depicted in FIGS. 11A and 12A. In order to properly position the components, a shuttle frame or other device may be utilized. Strands 41 and layers 42 and 43 are then heated to a temperature that facilitates bonding between the components, depending upon the specific materials utilized for layers 42 and 43. Various radiant heaters or other devices may be utilized to heat the components of tensile element 40. In some manufacturing processes, mold 60 may be heated such that contact between mold 60 and the components of tensile element 40 raises the temperature of the components to a level that facilitates bonding. Radio frequency heating may also be utilized to heat the components of material element 40.

Figure 11B:
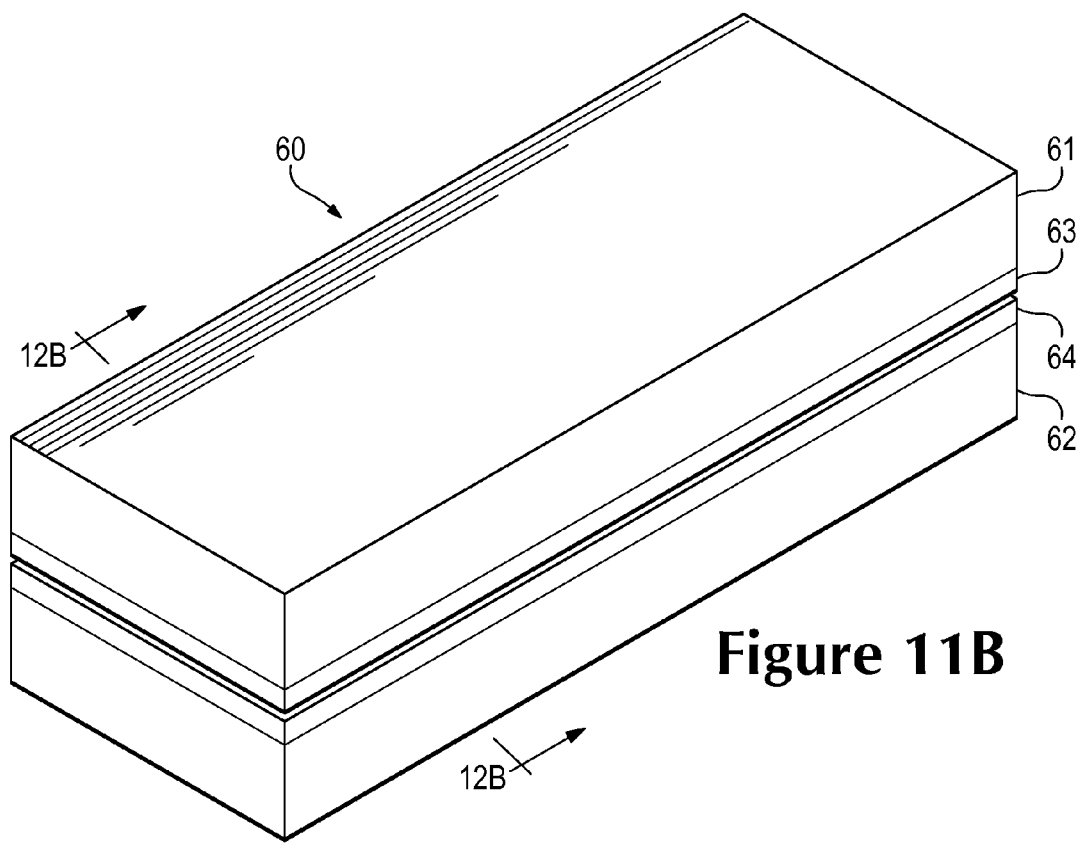

Once positioned and heated, mold portions 61 and 62 translate toward each other and begin to close upon the components such that (a) the surface of first mold portion 61 having material 63 contacts cover layer 42 and (b) the surface of second mold portion 62 having material 64 contacts base layer 41. Mold portions 61 and 62 then translate further toward each other and compress the components of tensile element 40, as depicted in FIGS. 11B and 12B, thereby bonding the components together. In some processes, conductive heat from mold 60 may heat the components of tensile element 40 while being compressed between mold portions 61 and 62.

As discussed above, incorporating a thermoplastic polymer material (e.g., thermoplastic polyurethane) into one or both of layers 42 and 43 may facilitate bonding between layers 42 and 43, as well as securing strands 41 between layers 42 and 43. A thermoplastic polymer material within base layer 42 may be utilized, therefore, to secure the components of tensile element 40 together. A thermoplastic polymer material melts or softens when heated and returns to a solid state when cooled sufficiently. Based upon this property of thermoplastic polymer materials, heatbonding processes may be utilized to form a heatbond that joins portions of tensile element 40. As utilized herein, the term "heatbonding" or variants thereof is defined as a securing technique between two elements that involves a softening or melting of a thermoplastic polymer material within at least one of the elements such that the materials of the elements are secured to each other when cooled. Similarly, the term "heatbond" or variants thereof is defined as the bond, link, or structure that joins two elements through a process that involves a softening or melting of a thermoplastic polymer material within at least one of the elements such that the materials of the elements are secured to each other when cooled. As examples, heatbonding may involve (a) the melting or softening of two elements incorporating thermoplastic polymer materials such that the thermoplastic polymer materials intermingle with each other (e.g., diffuse across a boundary layer between the thermoplastic polymer materials) and are secured together when cooled; (b) the melting or softening of an element incorporating a thermoplastic polymer material such that the thermoplastic polymer material extends into or infiltrates the structure of a strand (e.g., extends around or bonds with filaments or fibers in the strand) to secure the elements together when cooled; (c) the melting or softening of an element incorporating a thermoplastic polymer material such that the thermoplastic polymer material extends into or infiltrates the structure of a textile element (e.g., extends around or bonds with filaments or fibers in the textile element) to secure the elements together when cooled; and (d) the melting or softening of an element incorporating a thermoplastic polymer material such that the thermoplastic polymer material extends into or infiltrates crevices or cavities formed in another element (e.g., polymer foam or sheet, plate, structural device) to secure the elements together when cooled. Heatbonding may occur when only one element includes a thermoplastic polymer material or when both elements include thermoplastic polymer materials. Additionally, heatbonding does not generally involve the use of stitching or adhesives, but involves directly bonding elements to each other with heat. In some situations, however, stitching or adhesives may be utilized to supplement the heatbond or the joining of elements through heatbonding.

Although a heatbonding process may be utilized to form a heatbond that joins base layer 42 to cover layer 43 and strands 41, the configuration of the heatbond at least partially depends upon the components of tensile element 40. As a first example, when cover layer 43 is a textile, then the thermoplastic polymer material of base layer 42 may extend around or bond with filaments in cover layer 43 to secure the components together when cooled. As a second example, when cover layer 43 is a polymer sheet formed from a thermoplastic polymer material, then the polymer materials may intermingle with each other to secure the components together when cooled. If, however, the thermoplastic polymer material of cover layer 43 has a melting point that is significantly higher than the thermoplastic polymer material of base layer 42, then the thermoplastic polymer material of base layer 42 may extend into the structure, crevices, or cavities of cover layer 43 to secure the components together when cooled. As a third example, strands 41 may be formed from a thread having a plurality of individual filaments or fibers, and the thermoplastic polymer material of base layer 42 may extend around or bond with the filaments or fibers to secure the components together when cooled. As a fourth example, strands 41 may be formed to have the configuration of a single filament, and the thermoplastic polymer material of base layer 42 may extend around or bond with the filament to secure the components together when cooled. If, however, the filament is at least partially formed from a thermoplastic polymer material, then the polymer materials may intermingle with each other to secure the components together when cooled. Accordingly, a heatbond may be utilized to join the components of tensile element 40 together even when the components are formed from a diverse range of materials or have one of a variety of structures.

As noted above, material 63 has a lesser hardness, a lesser density, and greater thickness than material 64 and, as a result, material 63 compresses more easily than material 64. Referring again to FIGS. 11B and 12B, cover layer 43 protrudes into material 63 in the areas of strands 41, whereas base layer 42 remains substantially planar. Due to the different compressibilities between materials 63 and 64, material 63 compresses in areas where strands 41 are present. At this stage, the depth to which base layer 42 protrudes into material 64 is less than the depth to which cover layer 43 protrudes into material 63. The compressive force of mold 60, coupled with the elevated temperature of the compressed components (a) bonds layers 42 and 43 to each other, (b) may bond strands 41 to either of layers 42 and 43, and (c) molds material element 40 such that base layer 42 remains substantially planar and cover layer 43 protrudes outward in the area of strands 41.

The different compressibilities of materials 63 and 64 (due to differences in hardness, density, and thickness) ensures that cover layer 43 protrudes outward to a greater degree than base layer 42 in the areas of strands 41. In some configurations, the relative compressibilities of materials 63 and 64 may allow base layer 42 to protrude outward to some degree in the areas of strands 41. In other configurations, materials 63 and 64 may be substantially identical such that layers 42 and 43 protrude outward to the same degree in the areas of strands 41.

Figure 11C:
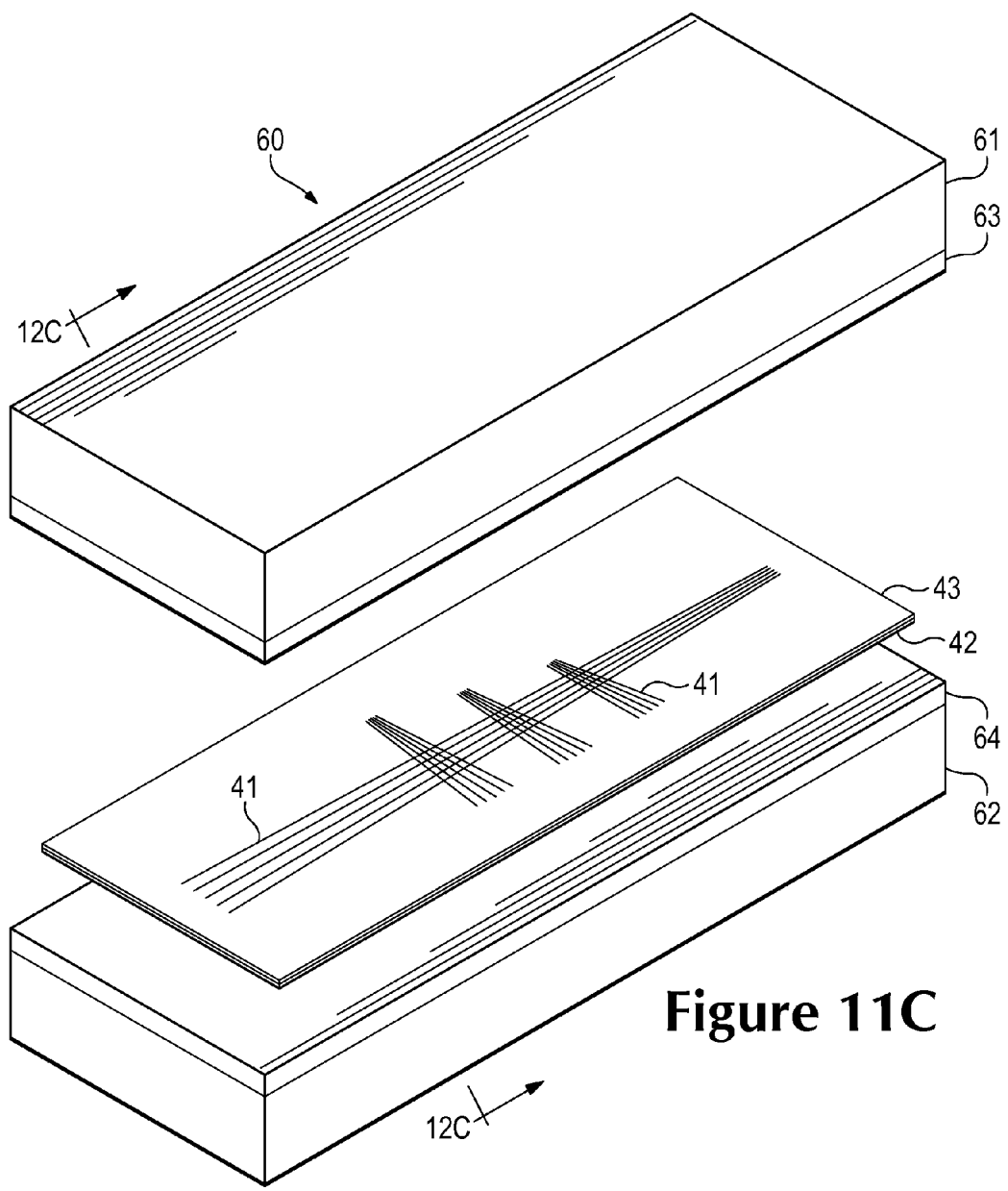
Figure 11D:
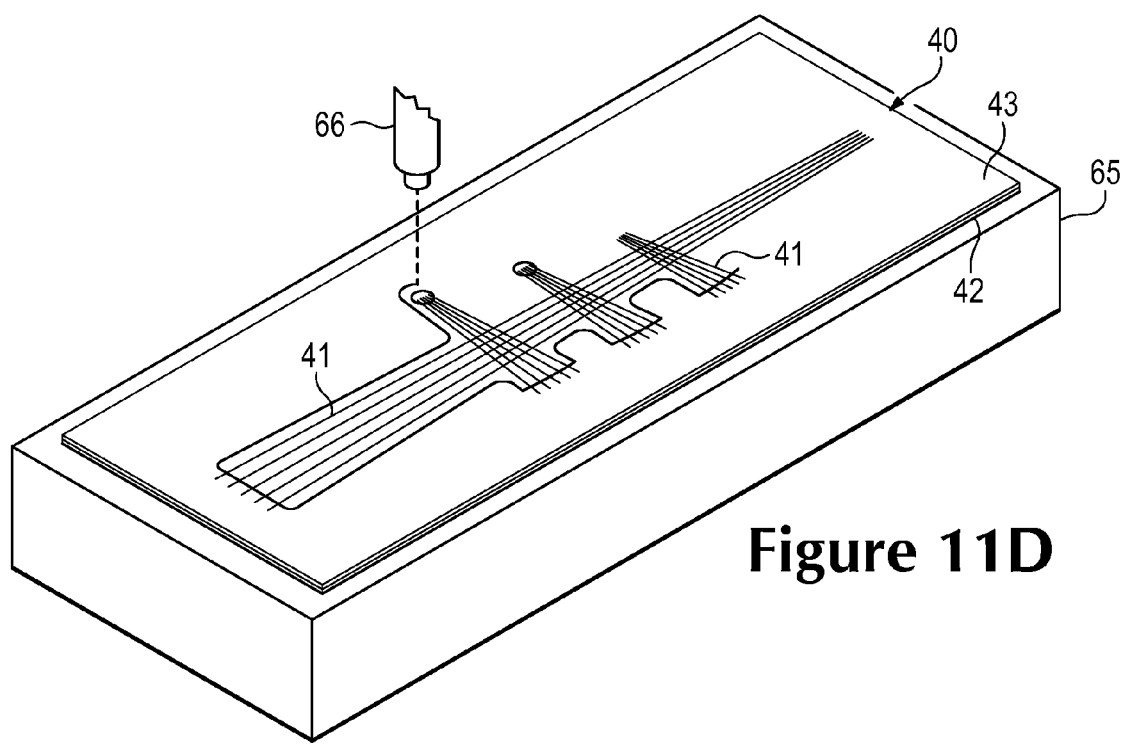
Figure 11E:
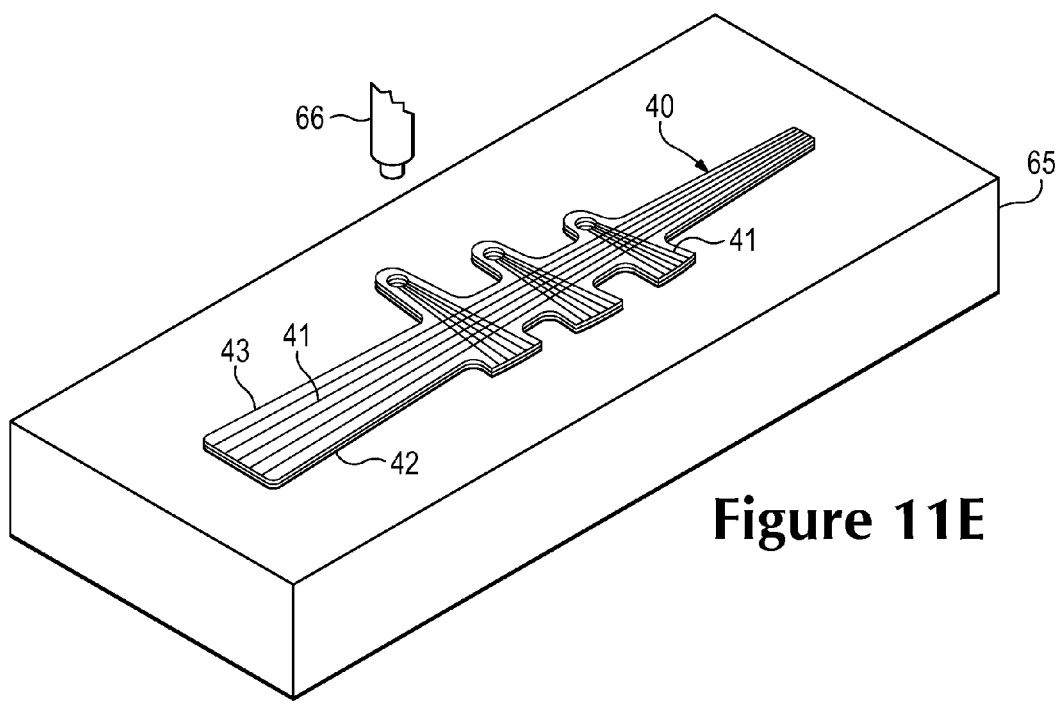

When bonding and shaping is complete, mold 60 is opened and tensile element 40 is removed and permitted to cool, as depicted in FIGS. 11C and 12C. At this stage of the process, tensile element 40 has a generally rectangular aspect due to the shapes of layers 42 and 43. In order to properly shape tensile element 40 for footwear 10, excess portions of layers 42 and 43 are removed. Referring to FIG. 11D, for example, tensile element 40 is placed upon a surface 65 and a laser apparatus 66 cuts through layers 42 and 43, as well as strands 41, to impart a particular shape to tensile element 40, as depicted in FIG. 11E. As an alternative to laser apparatus 66, die cutting or scissor cutting processes may be utilized to remove excess portions of layers 42 and 43.

As discussed above, layers 42 and 43 may have the same shape and size, such that edges of base layer 42 correspond and are even with edges of cover layer 43. Additionally, ends of strands 41 may be located at the edges of layers 42 and 43. Through the manufacturing process discussed above, edges of layers 42 and 43, as well as ends of strands 41, may all be positioned at edges of tensile element 40.

Figure 13A:
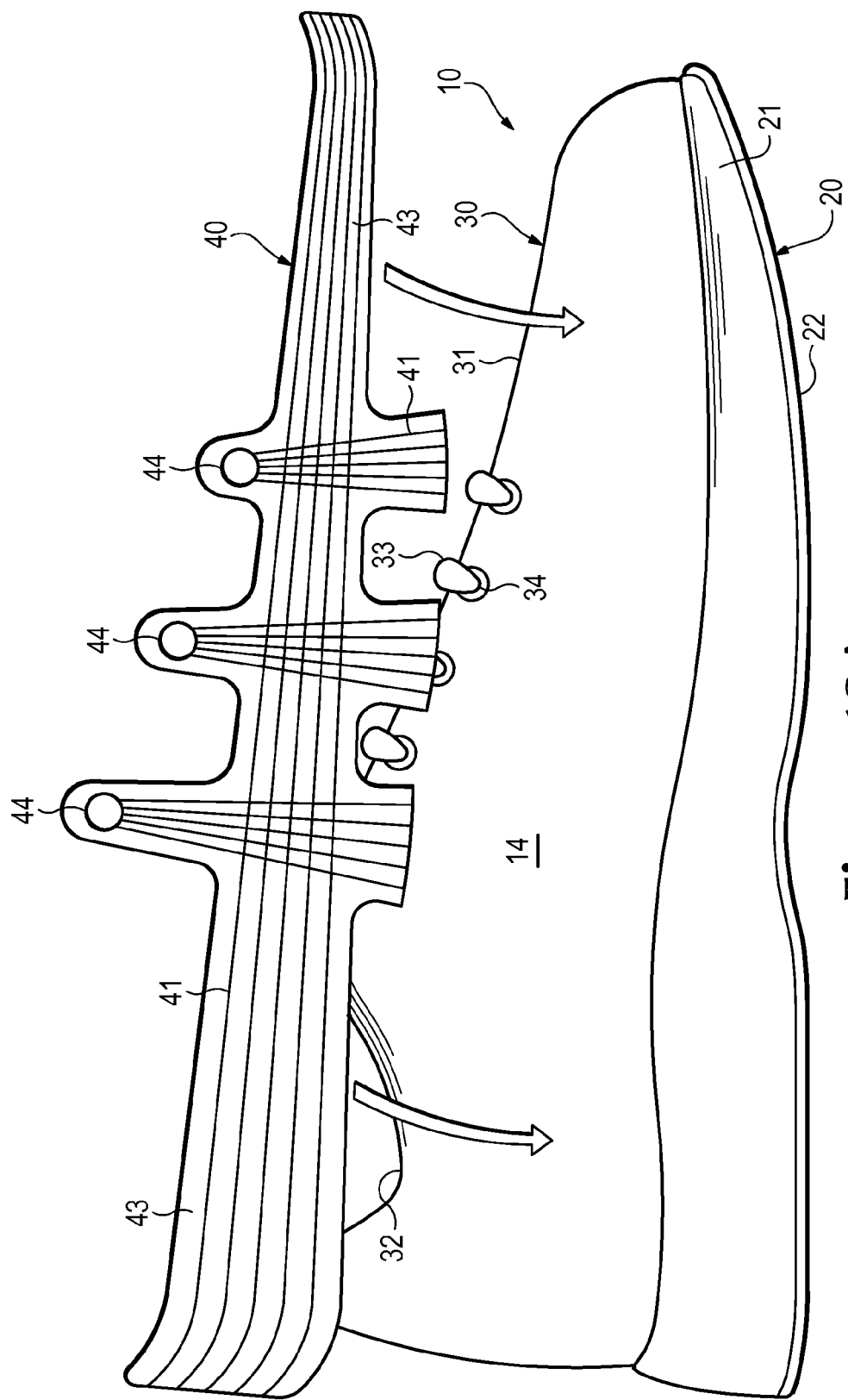
FIGS. 13A and 13B are schematic lateral side elevational views of a process for manufacturing the article of footwear.
Figure 13B:
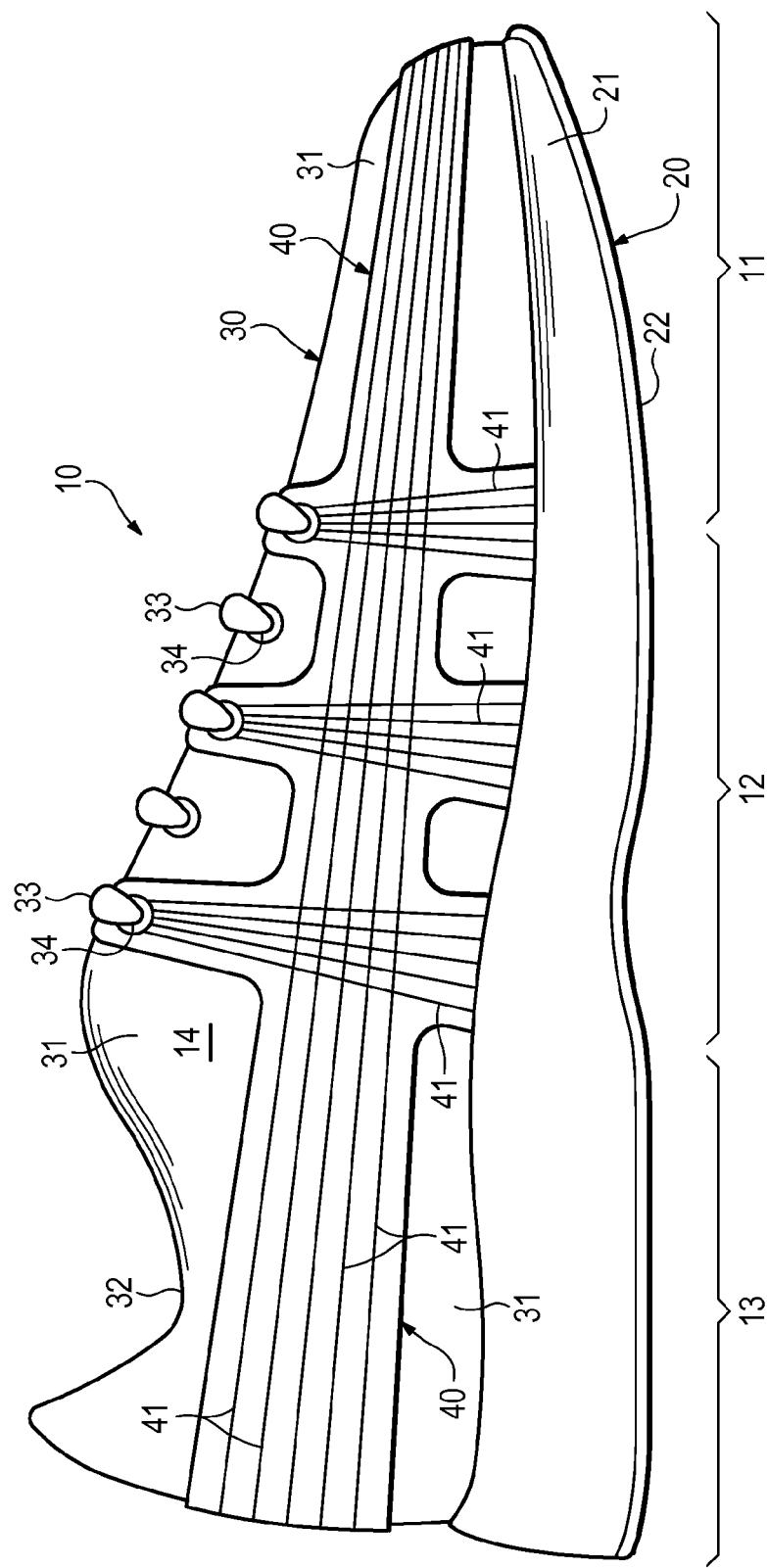

Once tensile element 40 is formed, tensile element 40 may be joined with foundation element 31, thereby incorporating tensile element 40 into footwear 10. Referring to FIG. 13A, tensile element 40 is positioned adjacent to lateral side 14. As discussed above, base layer 42 may incorporate a thermoplastic polymer material that forms a bond (i.e. a heatbond) with foundation element 31. Tensile element 40 may, therefore, be heated to elevate the temperature of base layer 42. Upon contact with foundation element 31, the thermoplastic polymer material of base layer 42 forms a bond with foundation element 31, thereby joining tensile element 40 with foundation element 31, as depicted in FIG. 13B. Accordingly, the thermoplastic polymer material of base layer 42 may be bonded with foundation element 31 to substantially complete the manufacturing of footwear 10. As alternatives, stitching or adhesive processes may be used to join tensile element 40 and foundation element 31.

The thermoplastic polymer material within base layer 42 may be heated prior to contact between tensile element 40 and foundation element 31. For example, radiant heaters may be utilized to heat base layer 42. In some processes, a heater may be located within the void in upper 20, and heat may conduct through foundation element 31 to induce the formation of a heatbond between tensile element 40 and foundation element 31.

Both tensile element 40 and foundation element 31 form portions of the exterior surface of upper 30. Given that the area of tensile element 40 is less than the area of foundation element 31, areas of the exterior surface of foundation element 31 are exposed beyond the edges of tensile element 40. As discussed above, portions of tensile element 40 may be formed from polymer materials or polymer sheets, whereas foundation element 31 may be formed from a textile material. Given that polymer sheets are generally less permeable to air than textiles, areas of upper 30 that include tensile element 40 may have less permeability than areas where foundation element 31 is exposed. An advantage to utilizing tensile element 40 is, therefore, that areas of upper 30 remain permeable to enhance the degree to which perspiration or heated air may exit upper 30 when footwear 10 is worn.

Further Configurations

Figure 14A:
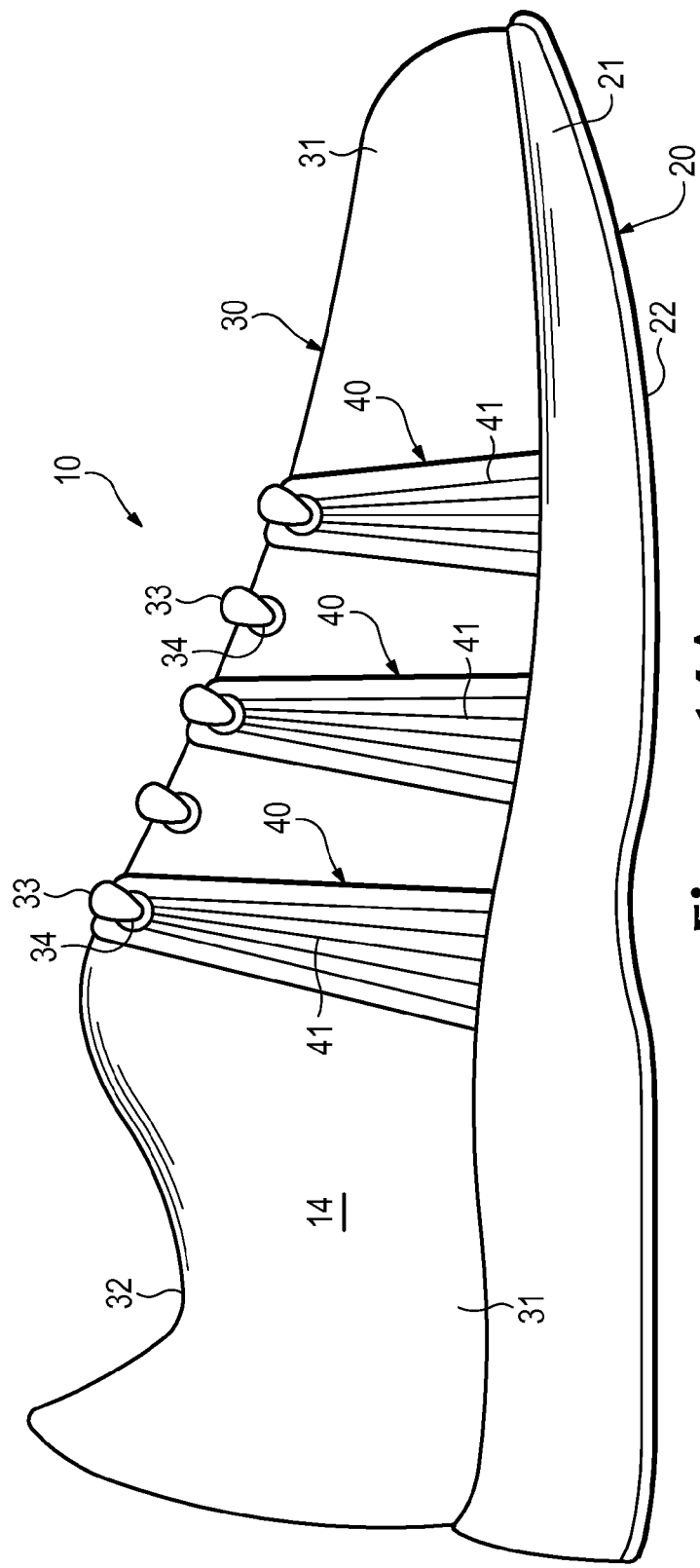
FIGS. 14A-14E are lateral side elevational views corresponding with FIG. 1 and depicting further configurations of the article of footwear.
Figure 14B:
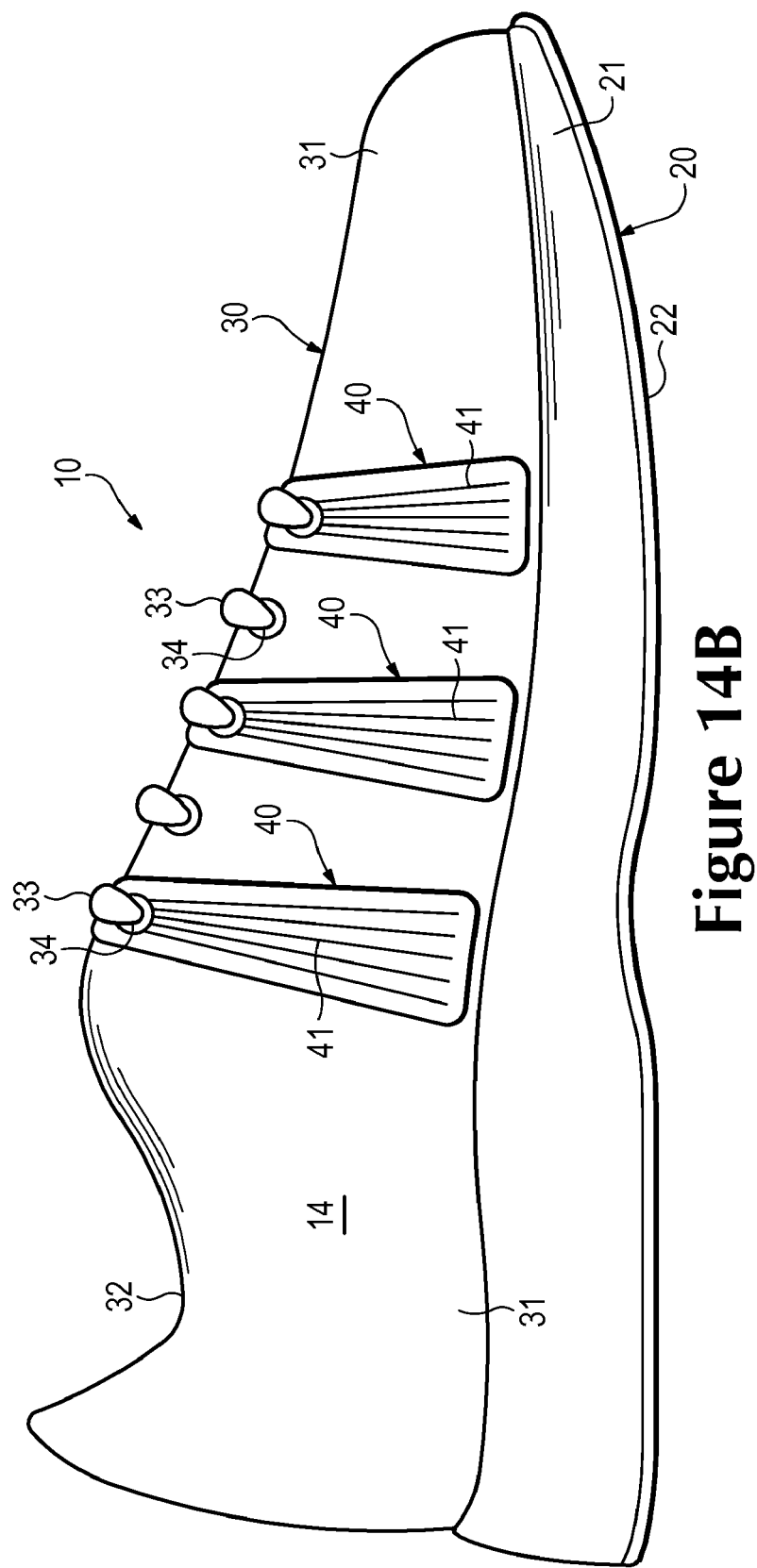
Figure 14C:
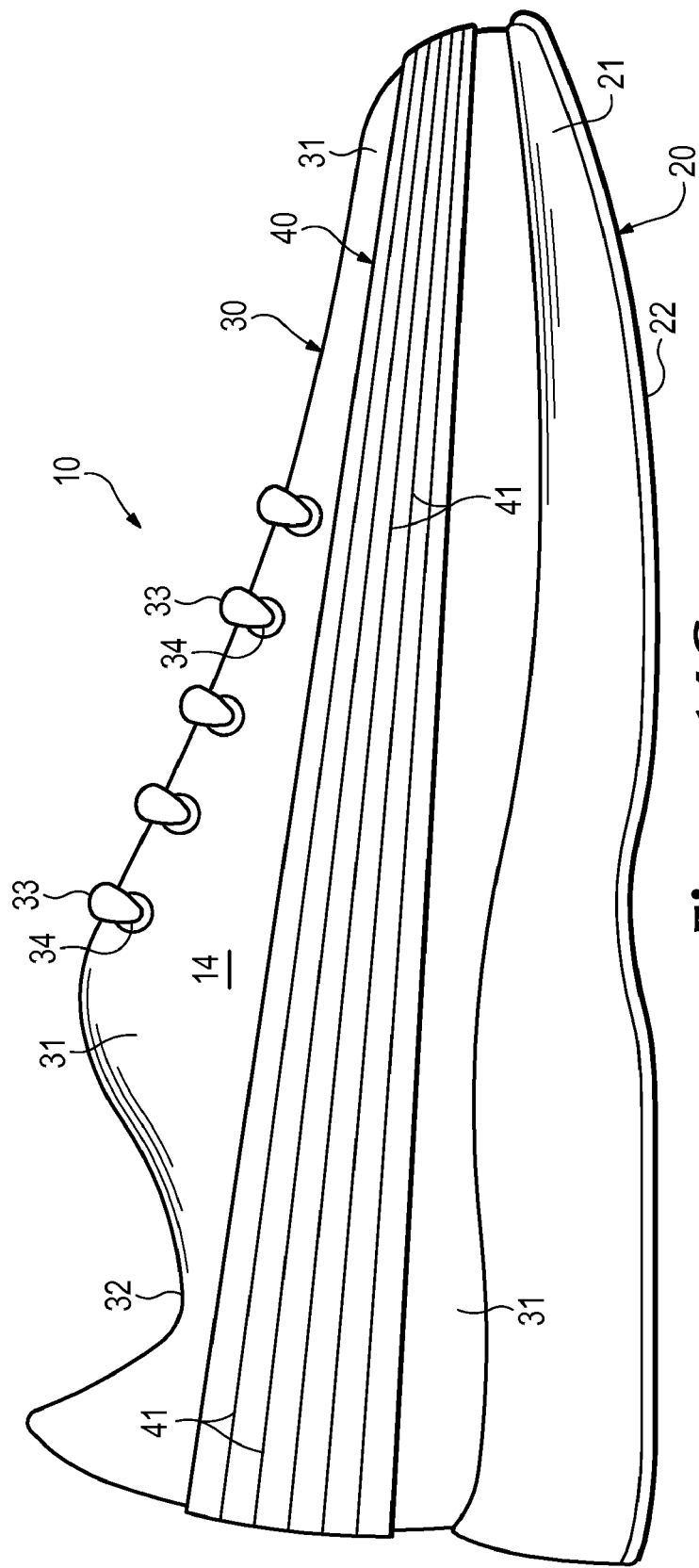
Figure 14D:
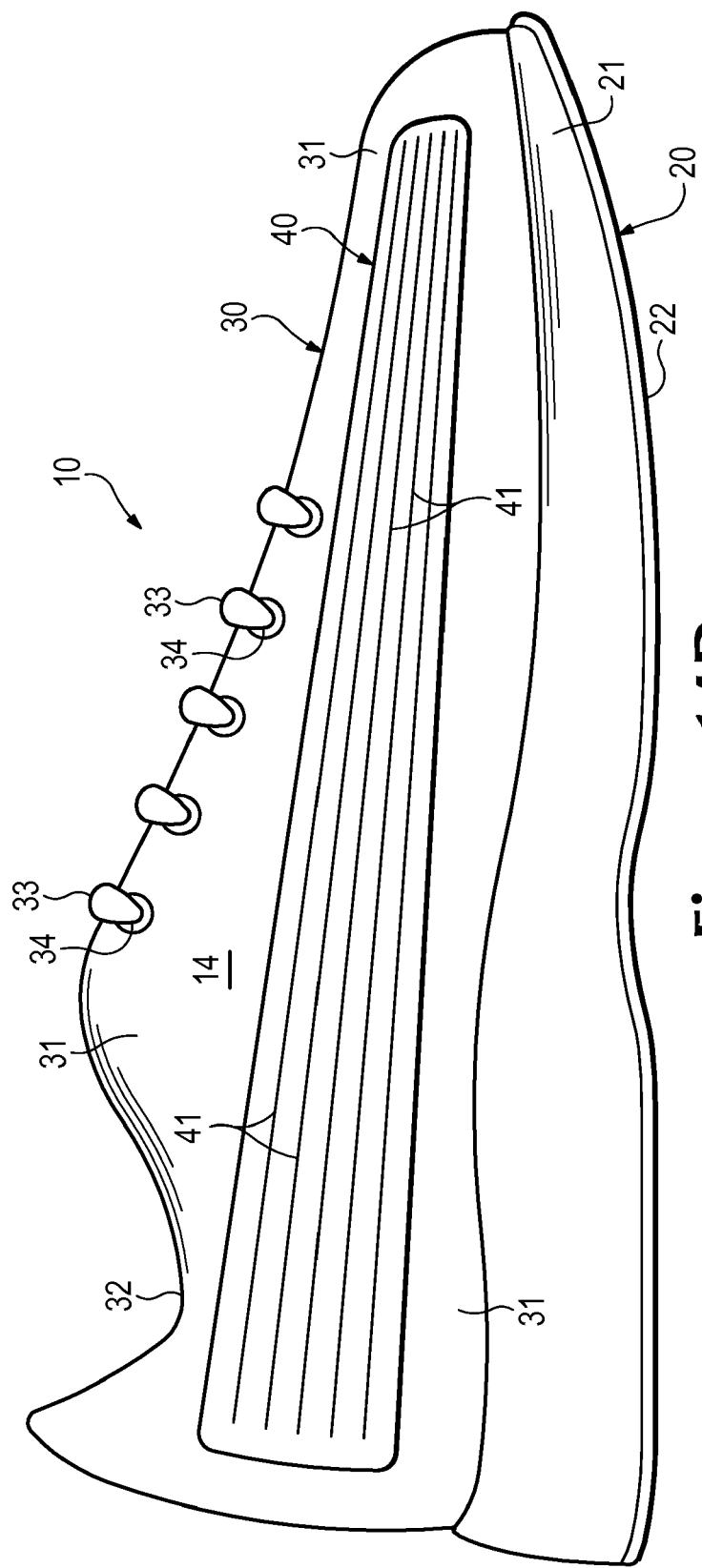
Figure 14E:
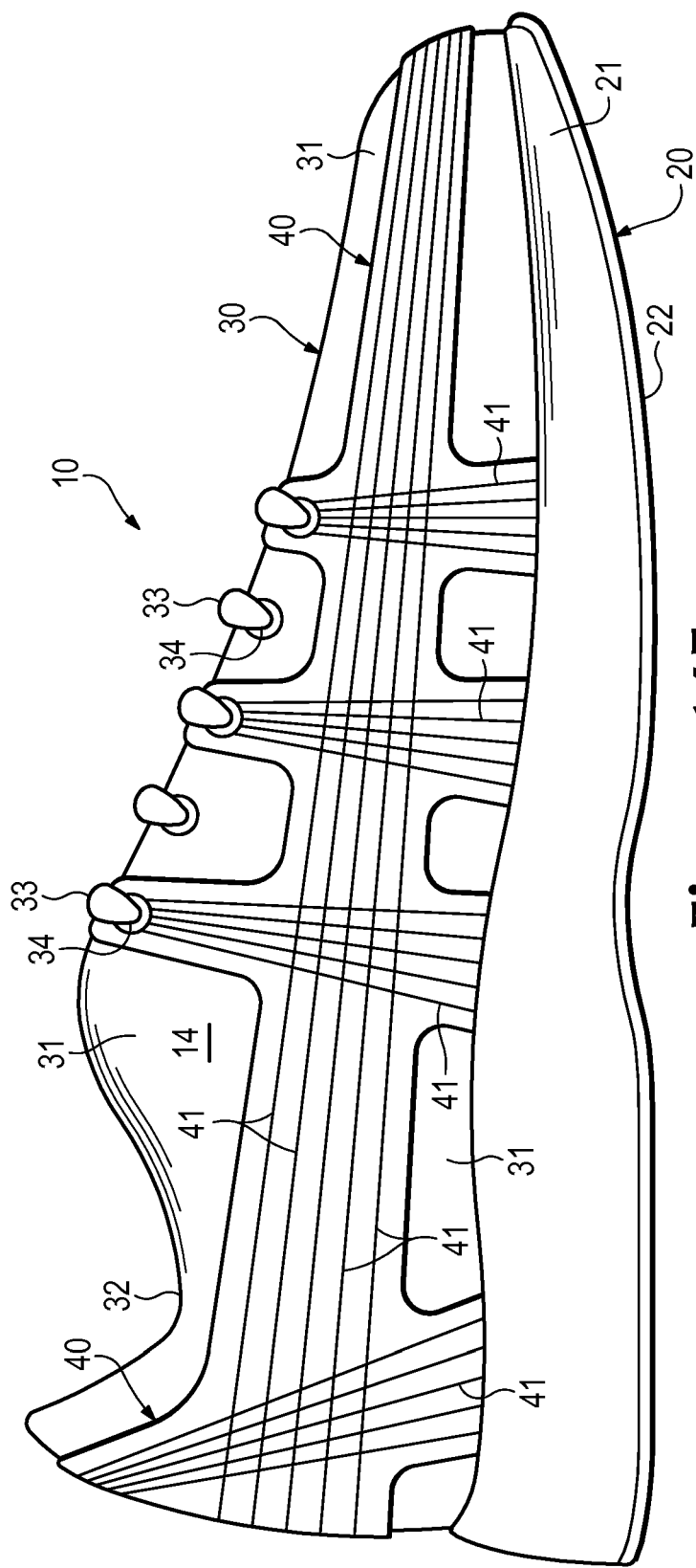

The orientations, locations, and quantity of strands 41 in FIGS. 1 and 2 are intended to provide an example of a suitable configuration for footwear 10. In other configurations of footwear 10, various aspects of tensile element 40 and footwear 10 may vary considerably. Referring to FIG. 14A, another configuration is depicted, wherein three separate tensile elements 40 include various strands that extend vertically between lace apertures 34 and sole structure 20. In comparison with FIG. 1, for example, strands 41 extending longitudinally through each of regions 11-13 are absent. Although tensile elements 40 may extend through all of a distance between lace apertures 34 and sole structure 20, various tensile elements 40 may also extend through only a portion of the distance, as depicted in FIG. 14B. Tensile element 40 may also have a configuration wherein strands 41 only extend longitudinally, as depicted in FIG. 14C, or through only a portion of a longitudinal length of footwear 10, as depicted in FIG. 14D. In further configurations, additional strands 41 may be located in heel region 13, as depicted in FIG. 14E, to effectively form a heel counter or other device that stabilizes a heel of a wearer. The specific configuration of strands 41 and other aspects of tensile element 40 may, therefore, vary significantly.

Figure 15A:
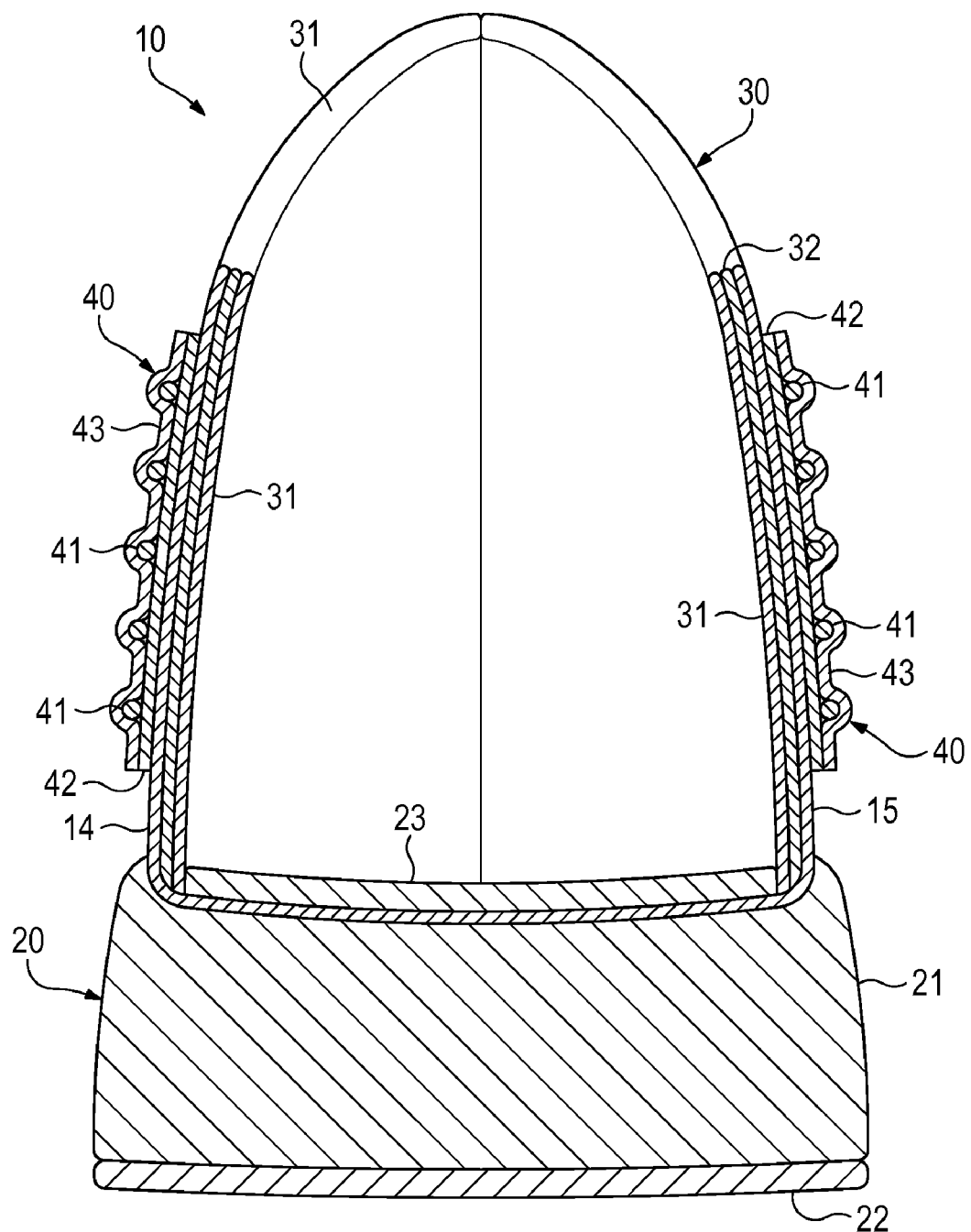
FIGS. 15A-15F are cross-sectional views corresponding with FIG. 3 and depicting further configurations of the article of footwear.
Figure 15B:
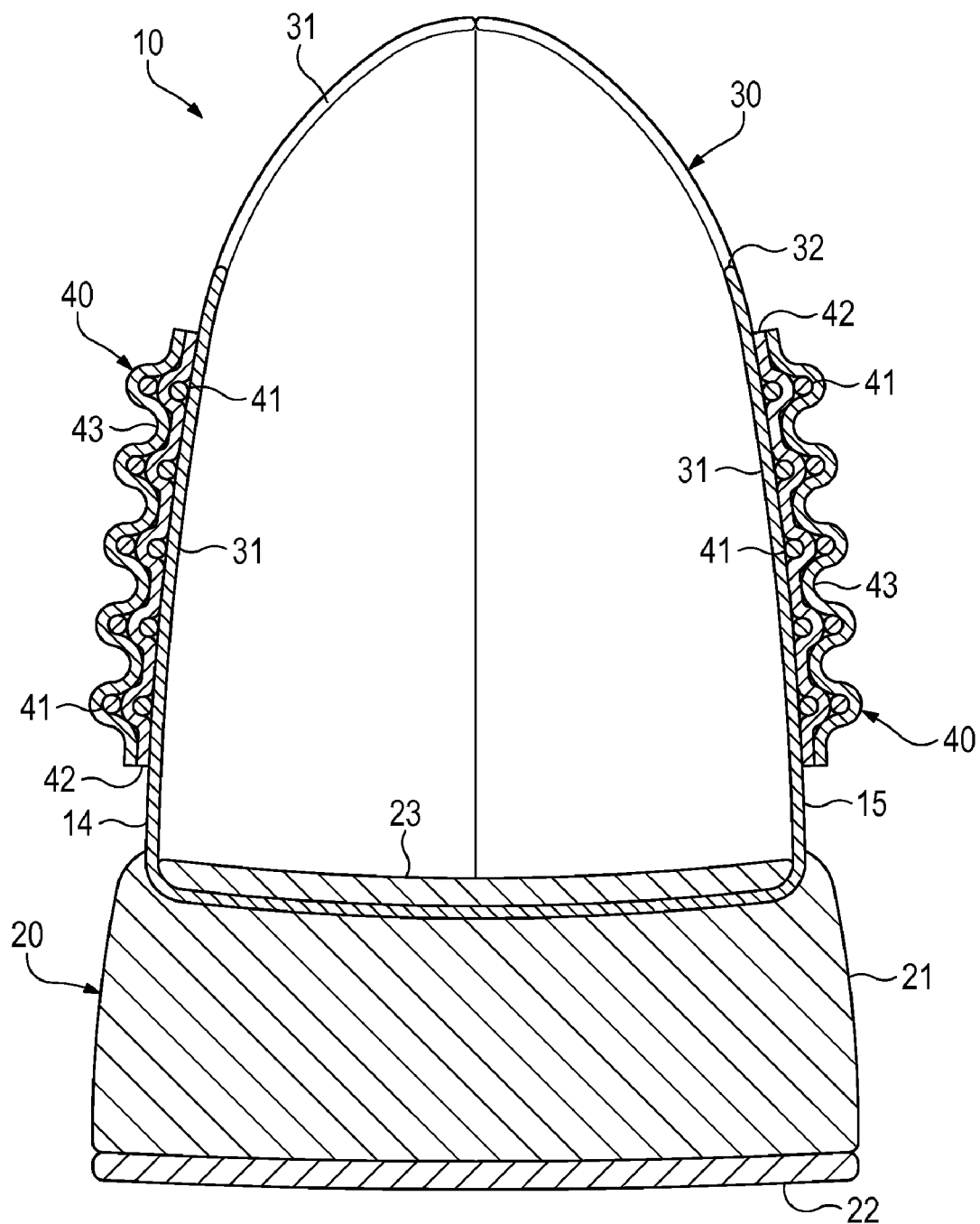
Figure 15C:
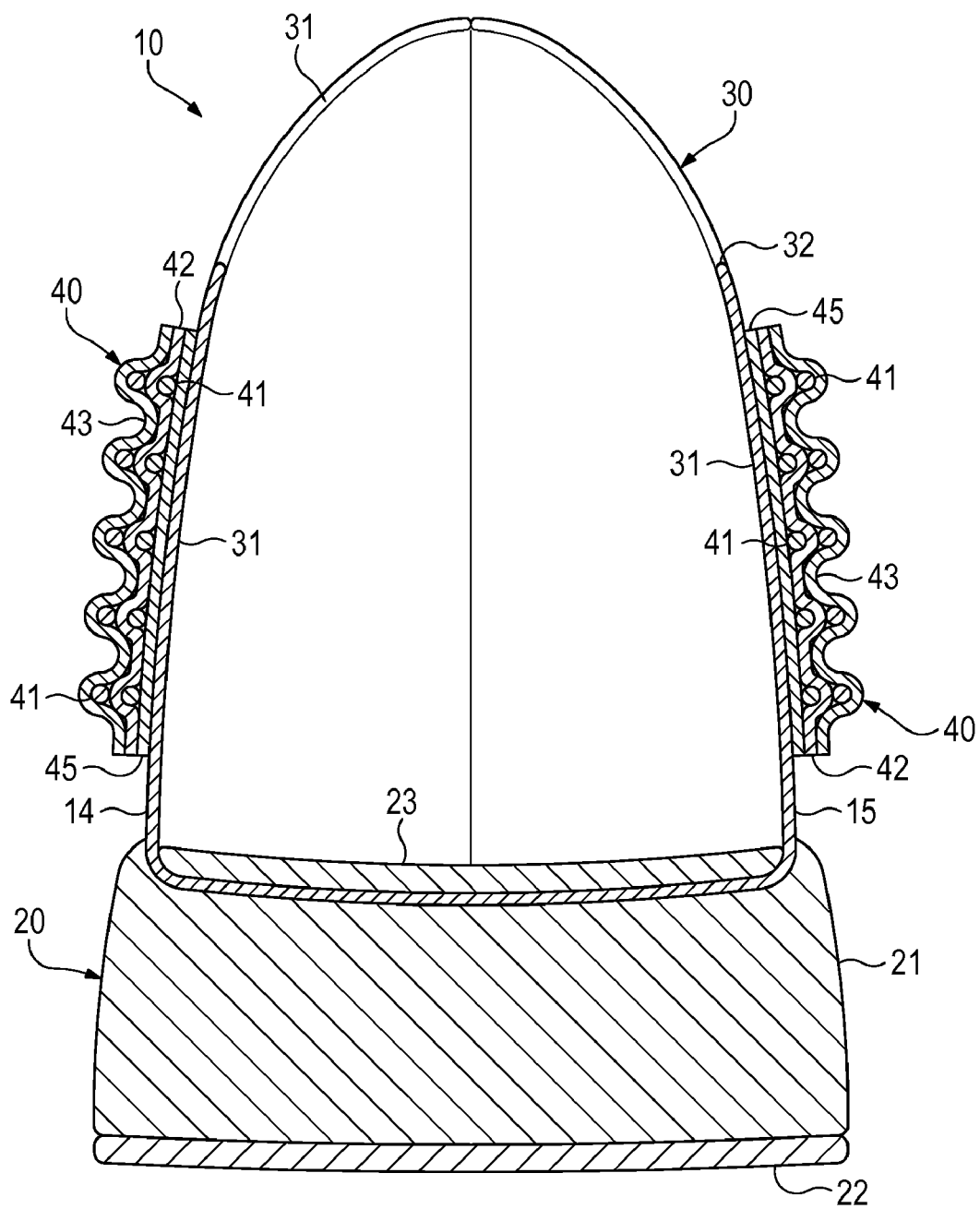
Figure 15D:
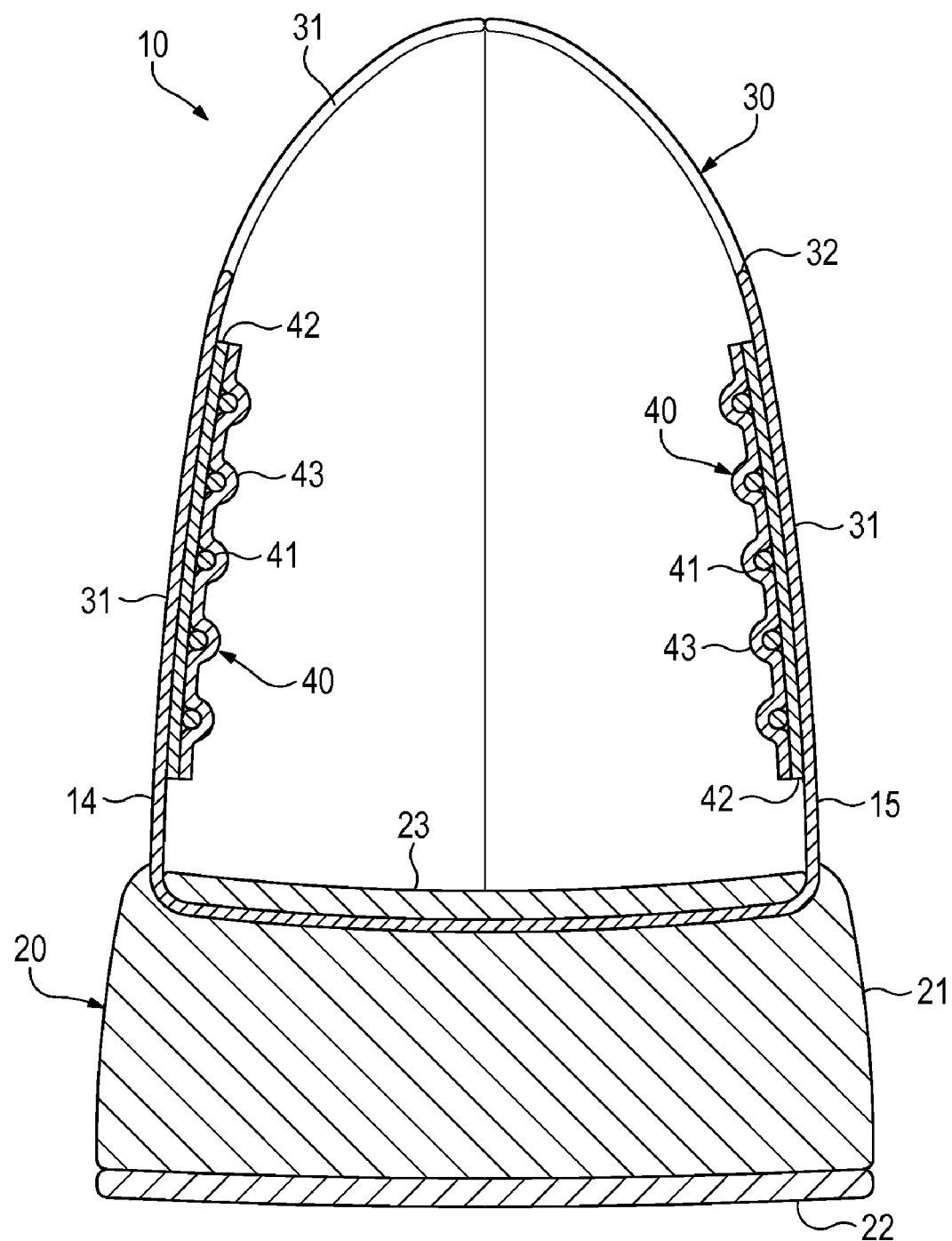
Figure 15E:
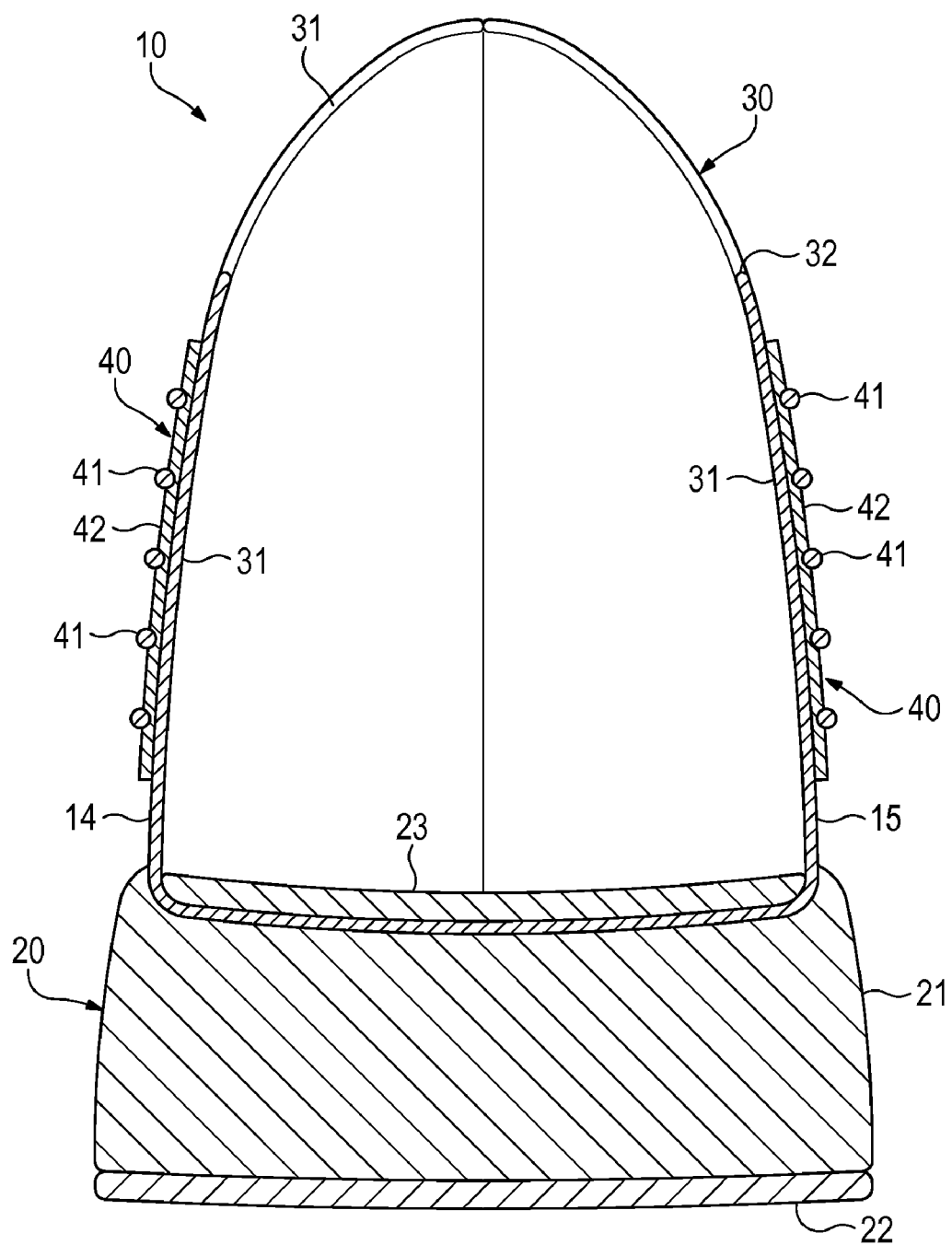
Figure 15F:
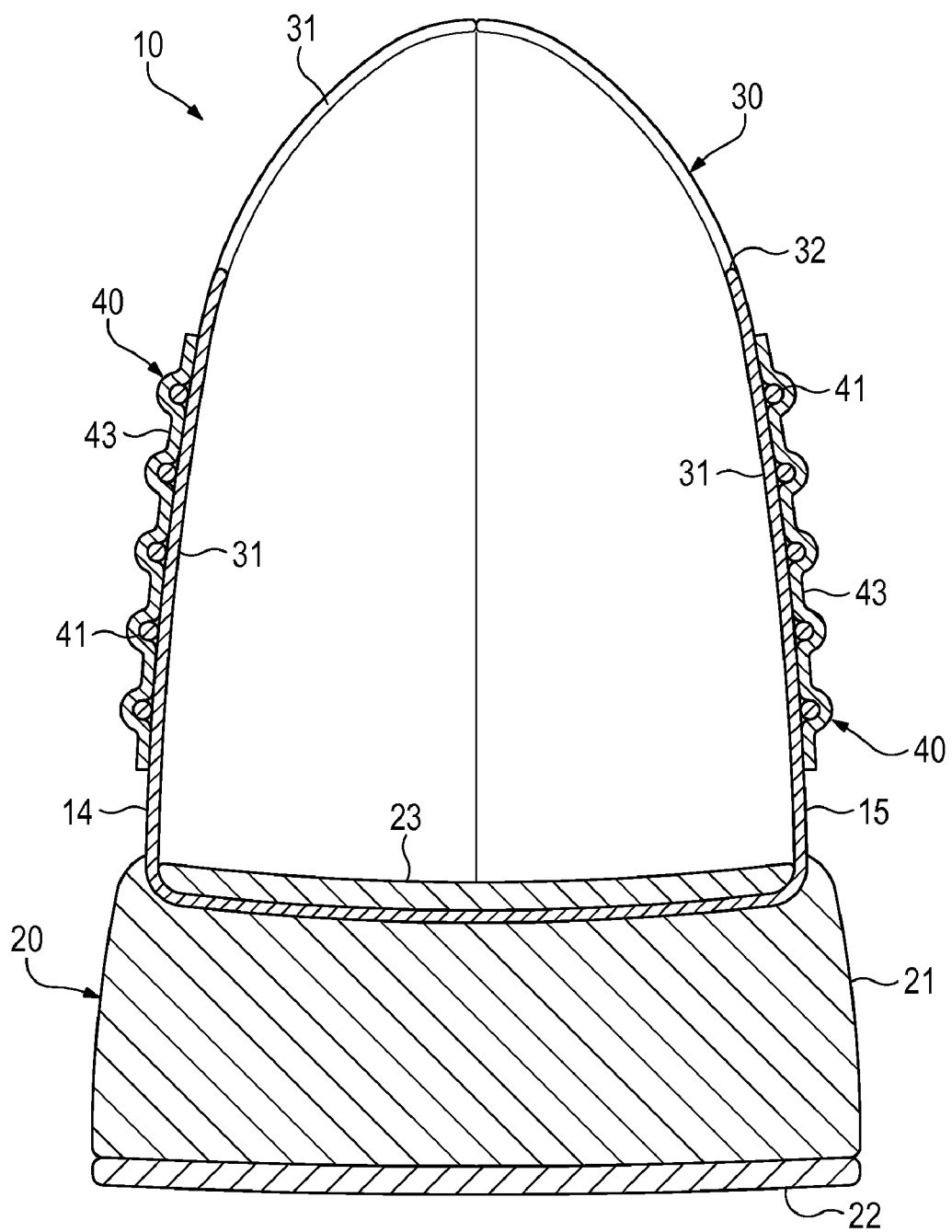

Foundation element 31 is depicted in FIG. 3 as being formed from a single layer of material. Referring to FIG. 15A, however, foundation element 31 includes three layers. As examples, the inner and outer layers may be textiles, whereas the central layer may be a comfort-enhancing polymer foam material. When an embroidery process is utilized to locate strands 41, two sets of strands 41 may be located on opposite sides of base layer 42, as depicted in FIG. 15B. An additional layer 45 may also extend between the second set of strands 41 and foundation element 31, as depicted in FIG. 15C. As with base layer 42, layer 45 may include a thermoplastic polymer material that induces bonding between tensile element 40 and foundation element 31. In general, the configuration depicted in FIG. 15C may be similar to a structure disclosed in U.S. patent application Ser. No. 12/180,235, which was entitled Composite Element With A Polymer Connecting Layer and filed in the U.S. Patent and Trademark Office on 25 Jul. 2008, such application being incorporated herein by reference. Referring to FIG. 15D, tensile element 40 is depicted as being joined with the interior surface of foundation element 31. In further configurations, cover layer 43 may be absent, as depicted in FIG. 15E, or base layer 42 may be absent, as depicted in FIG. 15F.

Further Manufacturing Process

Figure 16A:
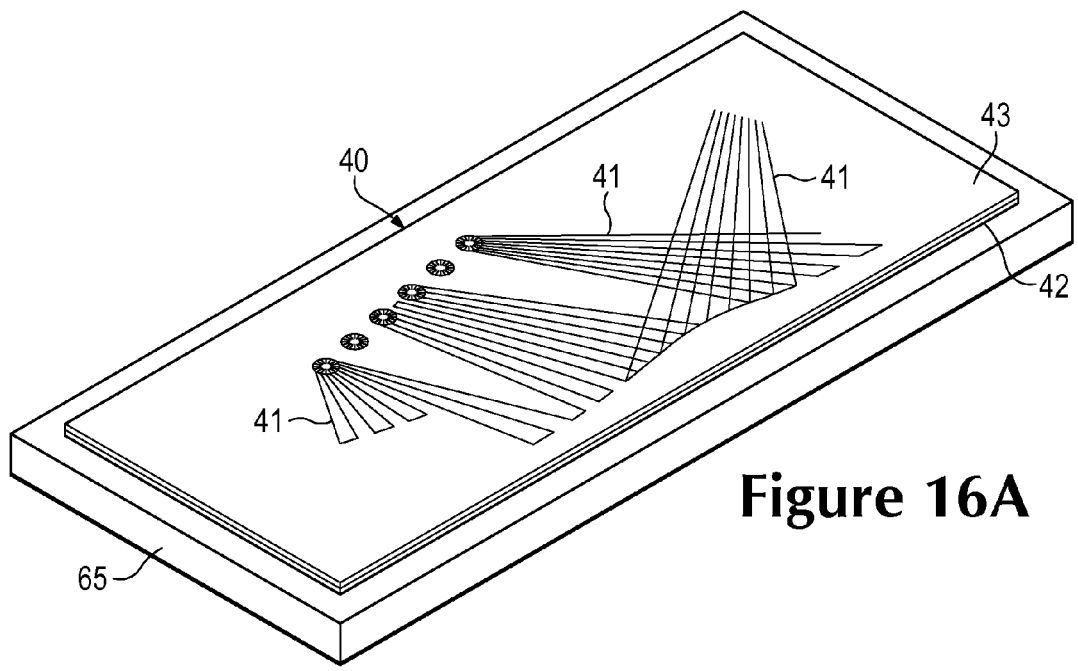
FIGS. 16A-16G are schematic perspective views of another process for manufacturing the tensile element.
Figure 16B:
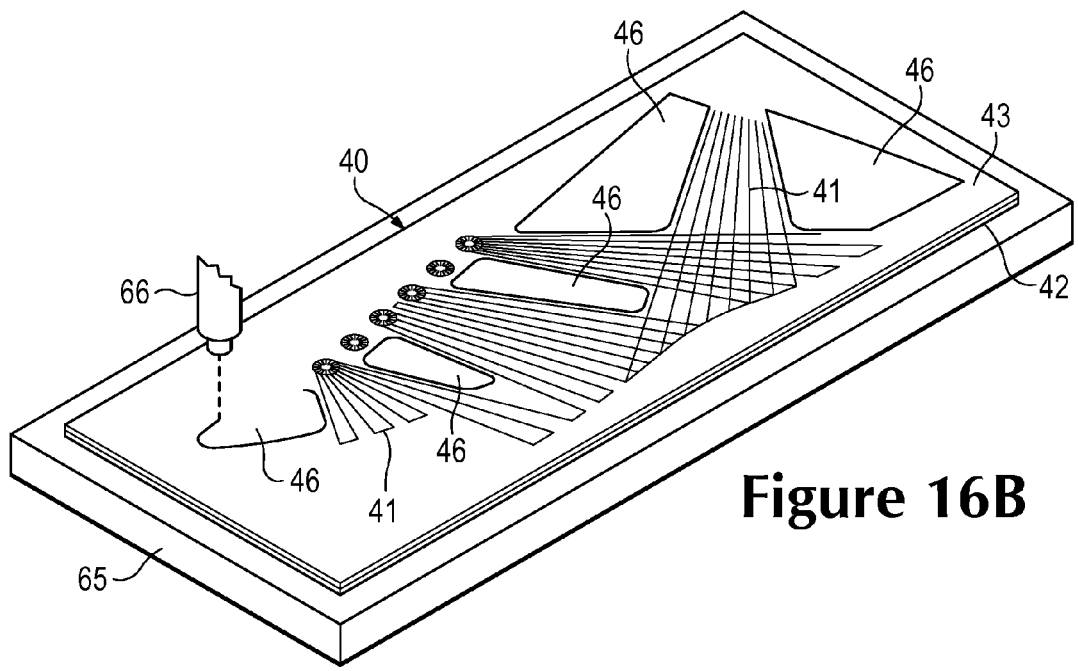
Figure 16C:
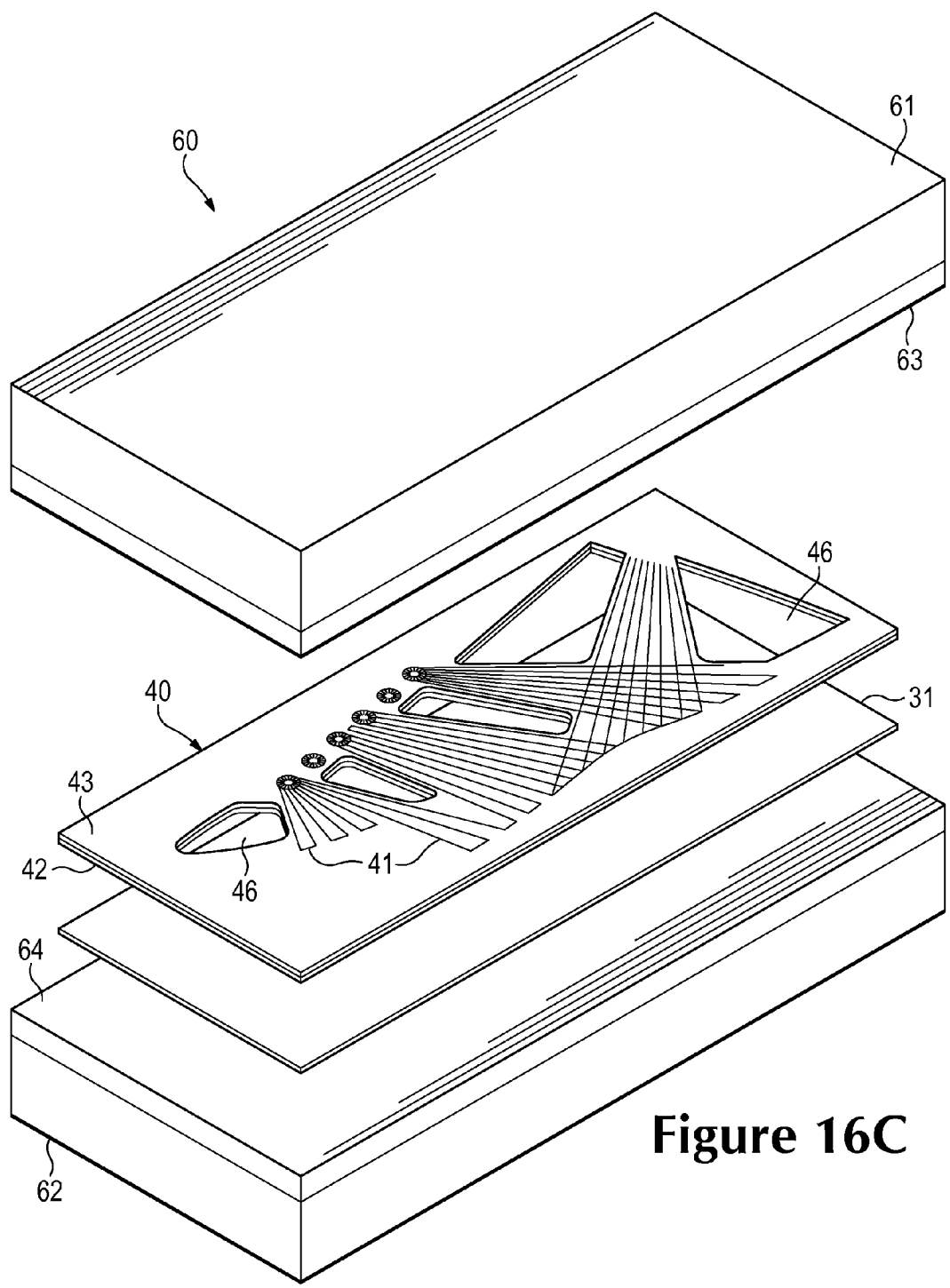

A further manufacturing process for forming tensile element 40 and securing tensile element 40 to foundation element 31 will now be discussed in relation to FIGS. 16A-16G. Referring to FIG. 16A, a variant upon the configuration for strands 41 is depicted as being located between layers 42 and 43. As discussed above, a variety of methods may be utilized to locate strands 41, including an embroidery process. Laser apparatus 66 or another cutting device may then be utilized to excise or remove various areas 46. That is, laser apparatus 66 may cut through layers 42 and 43 to form apertures or other regions where layers 42 and 43 are absent.

Figure 16D:
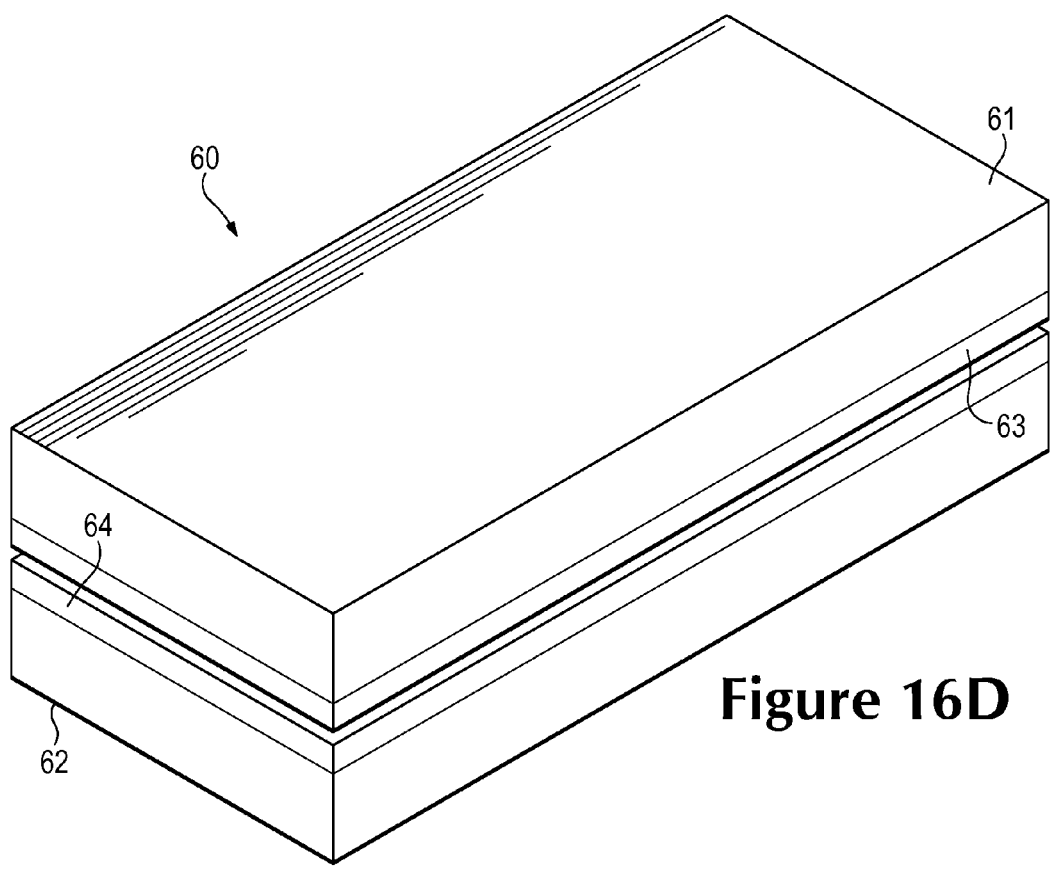
Figure 16E:
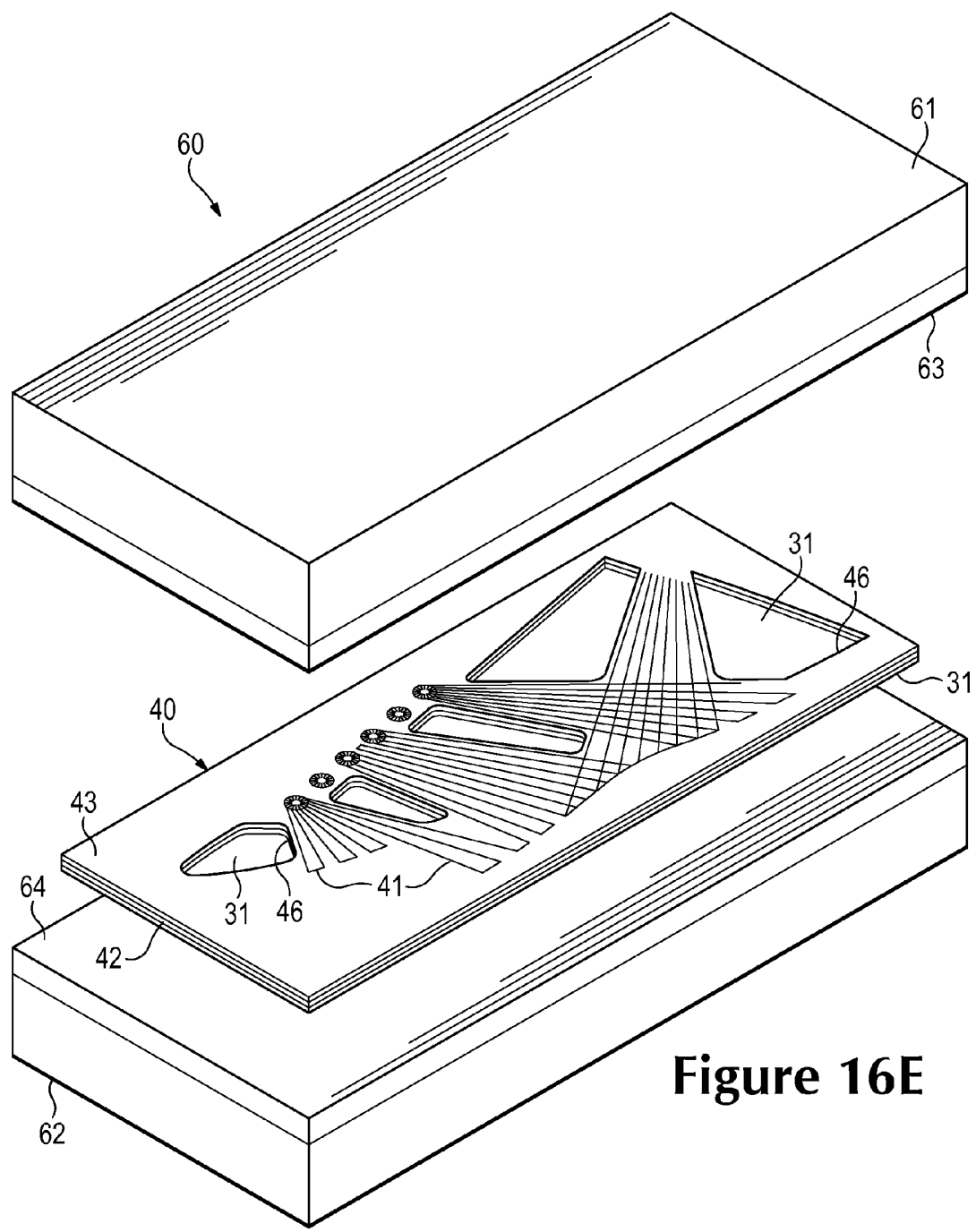

Once areas 46 are removed from layers 42 and 43, tensile element 40 and a portion of foundation element 31 are located within mold 60 (i.e., between mold portions 61 and 62). In the various methods discussed above, tensile element 40 is secured to foundation element 31 after incorporating foundation element 31 into footwear 10. In this method, however, tensile element 40 is secured to foundation element 31 (or a portion or layer of foundation element) prior to incorporating foundation element 31 into footwear 10. Once positioned, mold portions 61 and 63 compress tensile element 40 and foundation element 31, thereby bonding tensile element 40 and foundation element 31 together, as depicted in FIG. 16D. Upon opening mold 60, the bonded tensile element 40 and foundation element 31 may be removed, as depicted in FIG. 16E. Note that foundation element 31 is visible through the various areas 46 that are formed in tensile element 40.

Figure 16F:
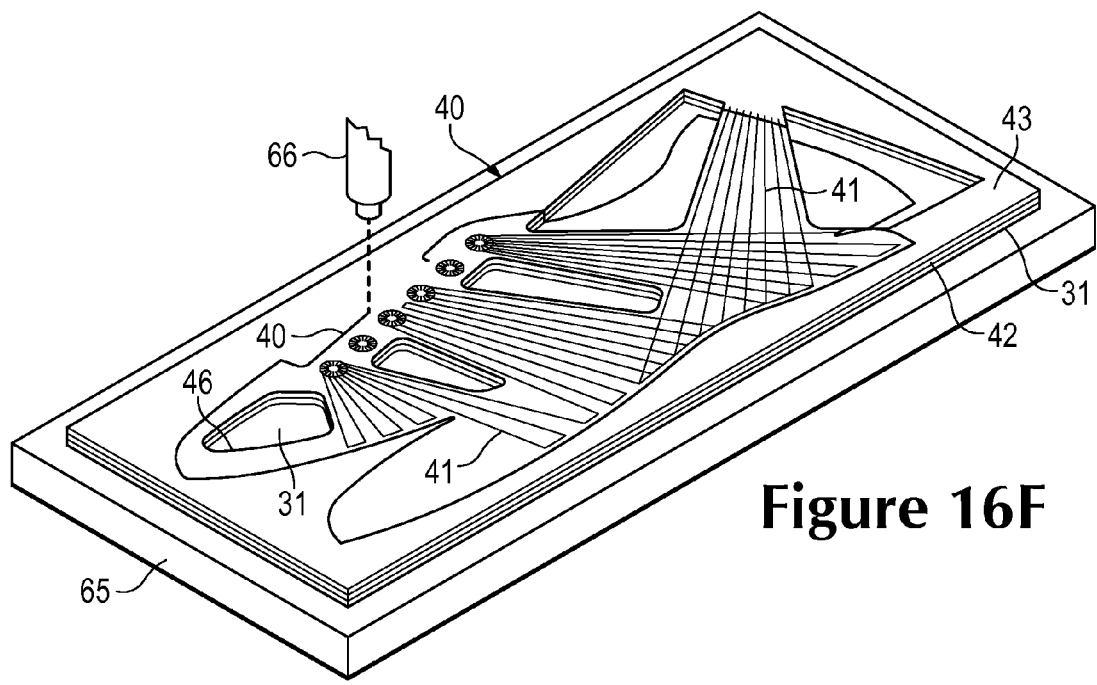
Figure 16G:
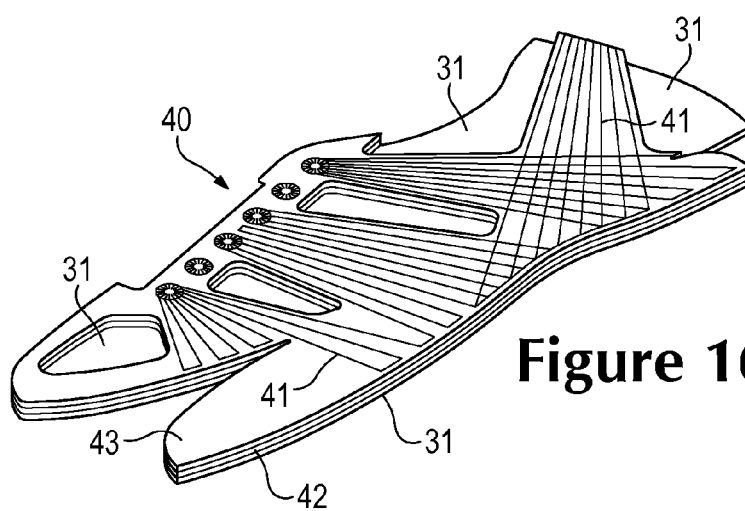

The combination of tensile element 40 and foundation element 31 may then be placed upon platen 65 and laser apparatus 66 is then used to cut through each of base layer 42, cover layer 43, and foundation element 31 to properly shape the combination of tensile element 40 and foundation element 31, as depicted in FIG. 16F. That is, laser apparatus 66 is utilized to remove excess portions of tensile element 40 and foundation element 31 to impart the shape depicted in FIG. 16G. This combination of tensile element 40 and foundation element 31 may then be incorporated into footwear 10.

The invention is disclosed above and in the accompanying figures with reference to a variety of configurations. The purpose served by the disclosure, however, is to provide an example of the various features and concepts related to the invention, not to limit the scope of the invention. One skilled in the relevant art will recognize that numerous variations and modifications may be made to the configurations described above without departing from the scope of the present invention, as defined by the appended claims.

The invention claimed is:

1. An article of footwear having an upper and a sole structure secured to the upper, the upper comprising:
   a foundation element having an interior surface and an opposite exterior surface, the interior surface defining at least a portion of a void within the upper for receiving a foot of a wearer; and
   a tensile element including a base layer and a plurality of strands, the base layer being secured to the exterior surface, the base layer being located between the strands and the exterior surface, and the base layer defining a plurality of edges that expose at least one area of the exterior surface, the strands being positioned in contact with the base layer and substantially parallel to the base layer for a distance of at least five centimeters.

2. The article of footwear recited in claim 1, wherein the base layer is at least partially formed from a thermoplastic polymer material.

3. The article of footwear recited in claim 2, wherein the base layer is joined to the foundation element with the thermoplastic polymer material.

4. The article of footwear recited in claim 2, wherein the base layer is joined to a cover layer with the thermoplastic polymer material, the strands being located between the cover layer and the base layer.

5. The article of footwear recited in claim 3, wherein the cover layer defines a plurality of edges, the edges of the cover layer being located at the edges of the base layer.

6. The article of footwear recited in claim 2, wherein the base layer is one of (a) a textile impregnated with the thermoplastic polymer material and (b) a sheet of the thermoplastic polymer material.

7. The article of footwear recited in claim 1, wherein ends of at least a portion of the strands are located at the edges of the base layer.

8. The article of footwear recited in claim 1, wherein the foundation element has a layered structure, at least a first layer of the layered structure forming the interior surface, and at least a second layer of the layered structure forming the exterior surface, the base layer being secured to the second layer.

9. The article of footwear recited in claim 1, wherein a group of the strands extends between a lace area of the upper and an area where the sole structure is joined to the upper.

10. The article of footwear recited in claim 9, wherein another group of the strands extends between a heel region and a forefoot region of the upper.

11. An article of footwear having an upper and a sole structure secured to the upper, the upper comprising:
    a foundation element having an interior surface and an opposite exterior surface, the interior surface defining at least a portion of a void within the upper for receiving a foot of a wearer; and
    a tensile element secured to the exterior surface, the tensile element including:
        (a) a base layer defining a plurality of base layer edges,
        (b) a cover layer that is coextensive with the base layer, the cover layer defining a plurality of cover layer edges located at the base layer edges, and
        (c) a plurality of strands positioned between the base layer and the cover layer, the strands being substantially parallel to the base layer for a distance of at least five centimeters, and ends of at least a portion of the strands being located at the edges of the base layer and the cover layer,
    wherein areas of the exterior surface extend beyond the tensile element and form portions of an exposed surface of the upper.

12. The article of footwear recited in claim 11, wherein the base layer is at least partially formed from a thermoplastic polymer material that (a) joins the tensile element to the exterior surface of the foundation element and (b) joins the cover layer to the base layer.

13. The article of footwear recited in claim 12, wherein the base layer is one of (a) a textile impregnated with the thermoplastic polymer material and (b) a sheet of the thermoplastic polymer material.

14. The article of footwear recited in claim 11, wherein the foundation element has a layered structure, at least a first layer of the layered structure forming the interior surface, and at least a second layer of the layered structure forming the exterior surface, the base layer being secured to the second layer.

15. The article of footwear recited in claim 11, wherein a first group of the strands extends between a lace area of the upper and an area where the sole structure is joined to the upper, and a second group of the strands extends between a heel region and a forefoot region of the upper, the first group of strands crossing the second group of strands.

16. An article of footwear having an upper and a sole structure secured to the upper, the upper comprising:
    a foundation element having an interior surface and an opposite exterior surface, the interior surface defining at least a portion of a void within the upper for receiving a foot of a wearer; and
    a tensile element having:
        (a) a base layer including a thermoplastic polymer material secured to the exterior surface, the base layer defining an edge,
        (b) a cover layer joined to the base layer with the thermoplastic polymer material, the cover layer defining an edge positioned at the edge of the base layer, and
        (c) a plurality of strands positioned between the base layer and the cover layer, the strands being substantially parallel to the base layer for a distance of at least five centimeters, and ends of at least a portion of the strands being located at the edges of the base layer and the cover layer,
    wherein an area of the tensile element is less than an area of the exterior surface of the foundation element, and portions of the exterior surface of the foundation element form an exposed surface of the upper.

17. The article of footwear recited in claim 16, wherein the base layer is one of (a) a textile impregnated with the thermoplastic polymer material and (b) a sheet of the thermoplastic polymer material.

18. The article of footwear recited in claim 16, wherein the foundation element has a layered structure, at least a first layer of the layered structure forming the interior surface, and at least a second layer of the layered structure forming the exterior surface, the base layer being secured to the second layer.

19. The article of footwear recited in claim 16, wherein a first group of the strands extends between a lace area of the upper and an area where the sole structure is joined to the upper, and a second group of the strands extends between a heel region and a forefoot region of the upper, the first group of strands crossing the second group of strands.

* * * * *